(12) United States Patent
Rodriguez et al.

(10) Patent No.: US 7,150,031 B1
(45) Date of Patent: Dec. 12, 2006

(54) SYSTEM AND METHOD FOR REMINDERS OF UPCOMING RENTABLE MEDIA OFFERINGS

(75) Inventors: Arturo A. Rodriguez, Norcross, GA (US); Dean F. Jerding, Roswell, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 297 days.

(21) Appl. No.: 09/693,784

(22) Filed: Oct. 20, 2000

Related U.S. Application Data

(63) Continuation-in-part of application No. 09/590,488, filed on Jun. 9, 2000.

(60) Provisional application No. 60/214,987, filed on Jun. 29, 2000.

(51) Int. Cl.
  *G06F 3/00* (2006.01)
  *G06F 13/00* (2006.01)
  *H04N 5/445* (2006.01)

(52) U.S. Cl. .......................................... 725/58; 725/87

(58) Field of Classification Search ................ 725/58, 725/87
  See application file for complete search history.

(56) References Cited

U.S. PATENT DOCUMENTS

| | | | |
|---|---|---|---|
| 4,706,121 A | 11/1987 | Young | |
| 4,751,578 A | 6/1988 | Reiter et al. | |
| 4,827,250 A | 5/1989 | Stallkamp | 345/441 |
| 4,885,775 A | 12/1989 | Lucas | |
| 4,908,713 A | 3/1990 | Levine | |
| 4,963,994 A | 10/1990 | Levine | |
| 4,984,152 A | 1/1991 | Mueller | 715/856 |
| 4,991,011 A | 2/1991 | Johnson et al. | |
| 5,038,211 A | 8/1991 | Hallenbeck | |
| 5,253,066 A | 10/1993 | Vogel | |
| 5,293,357 A | 3/1994 | Hallenbeck | |
| 5,410,326 A | 4/1995 | Goldstein | 348/734 |
| 5,477,262 A | 12/1995 | Banker et al. | |
| 5,479,268 A | 12/1995 | Young et al. | |
| 5,481,542 A | 1/1996 | Logston et al. | 370/94.2 |
| 5,508,815 A | 4/1996 | Levine | |
| 5,515,495 A | 5/1996 | Ikemoto | 345/835 |
| 5,530,754 A | 6/1996 | Garfinkle | 725/8 |
| 5,568,272 A | 10/1996 | Levine | |
| 5,585,821 A | 12/1996 | Ishikura et al. | 715/856 |
| 5,650,831 A | 7/1997 | Farwell | 348/734 |
| 5,699,107 A * | 12/1997 | Lawler et al. | 725/58 |
| 5,721,829 A | 2/1998 | Dunn et al. | 725/87 |

(Continued)

FOREIGN PATENT DOCUMENTS

EP    0 725 538 A3    5/1997

(Continued)

OTHER PUBLICATIONS

U.S. Appl. No. 09/378,533, McKissick et al., "Electronic Program Guide with Advance Notification".*

(Continued)

*Primary Examiner*—Scott Beliveau

(57) ABSTRACT

The invention can be viewed as a system for providing media information to a user via an interactive media services client device coupled to a programmable media services server device. A method of the preferred embodiment of the present invention includes adding a media title to a media title list in response to user input.

16 Claims, 21 Drawing Sheets

U.S. PATENT DOCUMENTS

| | | | |
|---|---|---|---|
| 5,724,106 A | 3/1998 | Autry et al. ................. 348/734 |
| 5,737,028 A | 4/1998 | Bertram et al. ............... 725/37 |
| 5,748,493 A | 5/1998 | Lightfoot et al. ........... 709/227 |
| 5,764,873 A | 6/1998 | Magid et al. ................ 345/769 |
| 5,771,435 A | 6/1998 | Brown ........................ 455/5.1 |
| 5,790,170 A | 8/1998 | Suzuki ........................... 348/2 |
| 5,808,611 A | 9/1998 | Johnson et al. ............. 345/804 |
| 5,809,204 A | 9/1998 | Young et al. |
| 5,850,218 A * | 12/1998 | LaJoie et al. ................. 725/45 |
| 5,861,906 A | 1/1999 | Dunn et al. |
| 5,915,068 A | 6/1999 | Levine |
| 5,969,748 A | 10/1999 | Casement et al. ............. 735/27 |
| 5,978,043 A | 11/1999 | Blonstein et al. ............ 348/569 |
| 5,986,650 A | 11/1999 | Ellis et al. ..................... 725/40 |
| 5,990,890 A | 11/1999 | Etheredge .................... 345/808 |
| 6,016,348 A | 1/2000 | Blatter et al. ............... 380/228 |
| 6,020,912 A | 2/2000 | De Lang ...................... 725/91 |
| 6,023,267 A * | 2/2000 | Chapuis et al. ............. 345/810 |
| 6,025,837 A | 2/2000 | Matthews, III et al. ..... 715/721 |
| 6,072,982 A | 6/2000 | Haddad ...................... 455/4.2 |
| 6,094,680 A | 7/2000 | Hokanson ................... 709/223 |
| 6,108,002 A * | 8/2000 | Ishizaki ........................ 725/58 |
| 6,157,377 A | 12/2000 | Shah-Nazaroff et al. .... 715/719 |
| 6,163,272 A | 12/2000 | Goode et al. ................. 725/30 |
| 6,166,730 A | 12/2000 | Goode et al. ............... 715/716 |
| 6,239,845 B1 | 5/2001 | Itagaki et al. ............... 348/552 |
| 6,292,624 B1 * | 9/2001 | Saib et al. ...................... 386/83 |
| 6,323,911 B1 * | 11/2001 | Schein et al. ............... 348/552 |
| 6,327,628 B1 | 12/2001 | Anuff et al. ................. 719/311 |
| 6,357,046 B1 | 3/2002 | Thompson et al. ......... 725/139 |
| 6,359,636 B1 | 3/2002 | Schindler et al. ........... 715/846 |
| 6,362,841 B1 | 3/2002 | Nykanen ..................... 715/835 |
| 6,396,549 B1 | 5/2002 | Weber ......................... 348/734 |
| 6,400,280 B1 | 6/2002 | Osakabe ................. 340/825.25 |
| 6,532,589 B1 * | 3/2003 | Proehl et al. ................. 725/40 |
| 6,545,669 B1 | 4/2003 | Kinawi et al. .............. 345/173 |
| 6,609,253 B1 | 8/2003 | Swix et al. ................... 725/88 |
| 6,628,302 B1 | 9/2003 | White et al. ................ 715/717 |
| 6,651,044 B1 | 11/2003 | Stoneman .................... 706/10 |
| 6,701,523 B1 | 3/2004 | Hancock et al. .............. 725/25 |
| 2002/0026496 A1 * | 2/2002 | Boyer et al. ................ 709/218 |
| 2002/0042913 A1 * | 4/2002 | Ellis et al. ..................... 725/34 |
| 2003/0061619 A1 | 3/2003 | Giammaressi ............... 725/95 |
| 2003/0159147 A1 | 8/2003 | Young et al. ................. 725/47 |
| 2004/0117831 A1 * | 6/2004 | Ellis et al. ..................... 725/53 |
| 2005/0138657 A1 | 6/2005 | Leftwich ...................... 725/45 |

FOREIGN PATENT DOCUMENTS

| | | |
|---|---|---|
| WO | WO 96/41477 | 12/1996 |
| WO | WO 98/31116 | 7/1998 |
| WO | WO 99/57903 | 11/1999 |
| WO | WO 99/60790 | 11/1999 |
| WO | WO 00/60482 | 10/2000 |
| WO | WO 99/0059202 | 10/2000 |
| WO | WO 01/06788 | 1/2001 |

OTHER PUBLICATIONS

U.S. Appl. No. 09/330,792, Knudson et al., "Series Reminders and Series Recording from an Interactive Television Program Guide".*

U.S. Appl. No. 60/214,987, filed Jun. 29, 2000, entitled: Video-on-Demand Options for the Scientific Atlanta Video-on-Demand Application.

Addington, Timothy H., "System Architecture Specification for Video-On-Demand Application Development on the Explorer 2000™ Digital Home Communications Terminal", Revision 1.10r Review Copy, Mar. 4, 1999.

Goel, Shashi, "Client User Interface Specification (Phase 1) for Video-On-Demand Application Development on the Explorer 2000™ Digital Home Communications Terminal", Revision 1.10, Aug. 31, 1998.

Definition of "renting", Webster's II: New College Dictionary, 1995, Houghton Mifflin Company, p. 939.

* cited by examiner

SYSTEM AND METHOD FOR REMINDERS OF UPCOMING RENTABLE MEDIA OFFERINGS

CROSS-REFERENCE TO RELATED APPLICATIONS

This application is a continuation-in-part of application Ser. No. 09/590,488, filed on Jun. 9, 2000, and claims the benefit of U.S. Provisional Application No. 60/214,987, filed on Jun. 29, 2000, both of which are entirely incorporated herein by reference.

FIELD OF THE INVENTION

This invention relates in general to television systems, and more particularly, to the field of media-on-demand.

BACKGROUND OF THE INVENTION

With recent advances in digital transmission technology, cable television systems are now capable of providing much more than the traditional analog broadcast video. In implementing enhanced programming, the home communication terminal ("HCT"), otherwise known as the settop box, has become an important computing device for accessing video services and navigating a subscriber through a maze of available services. In addition to supporting traditional analog broadcast video functionality, digital HCTs (or "DHCTs") now also support an increasing number of two-way digital services such as video-on-demand.

Typically, a DHCT is connected to a cable or satellite television network and includes hardware and software necessary to provide the functionality of the digital television system at the client's site. Preferably, some of the software executed and data processed by a DHCT is downloaded and/or updated via the cable television network. Each DHCT also typically includes a processor, communication components and memory, and is connected to a television or other display device, such as a personal computer. While many conventional DHCTs are stand-alone devices that are externally connected to a television, a DHCT and/or its functionality may be integrated into a television or personal computer, as will be appreciated by those of ordinary skill in the art.

DHCTs are capable of providing users with a very large number and variety of media rentals. As the number of available media rentals increases, it can become inconvenient and time consuming for users to continually browse through unwanted media titles in order to find the ones that they like. Furthermore, users are often confronted with a choice of many desirable media titles to choose from such that after selecting and viewing a desirable media title, they often forget the names of other media titles that they were interested in viewing. Therefore, there exists a need to make it easier and more convenient for users to find and select desirable media titles.

SUMMARY OF THE INVENTION

The invention can be viewed as a system for providing media information to a user via an interactive media services client device coupled to a programmable media services server device. A method of the preferred embodiment of the present invention includes adding a media title to a media title list in response to user input.

BRIEF DESCRIPTION OF THE DRAWINGS

The invention can be better understood with reference to the following drawings. The components in the drawings are not necessarily drawn to scale, emphasis instead being placed upon clearly illustrating the principles of the present invention. In the drawings, like reference numerals designate corresponding parts throughout the several views.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
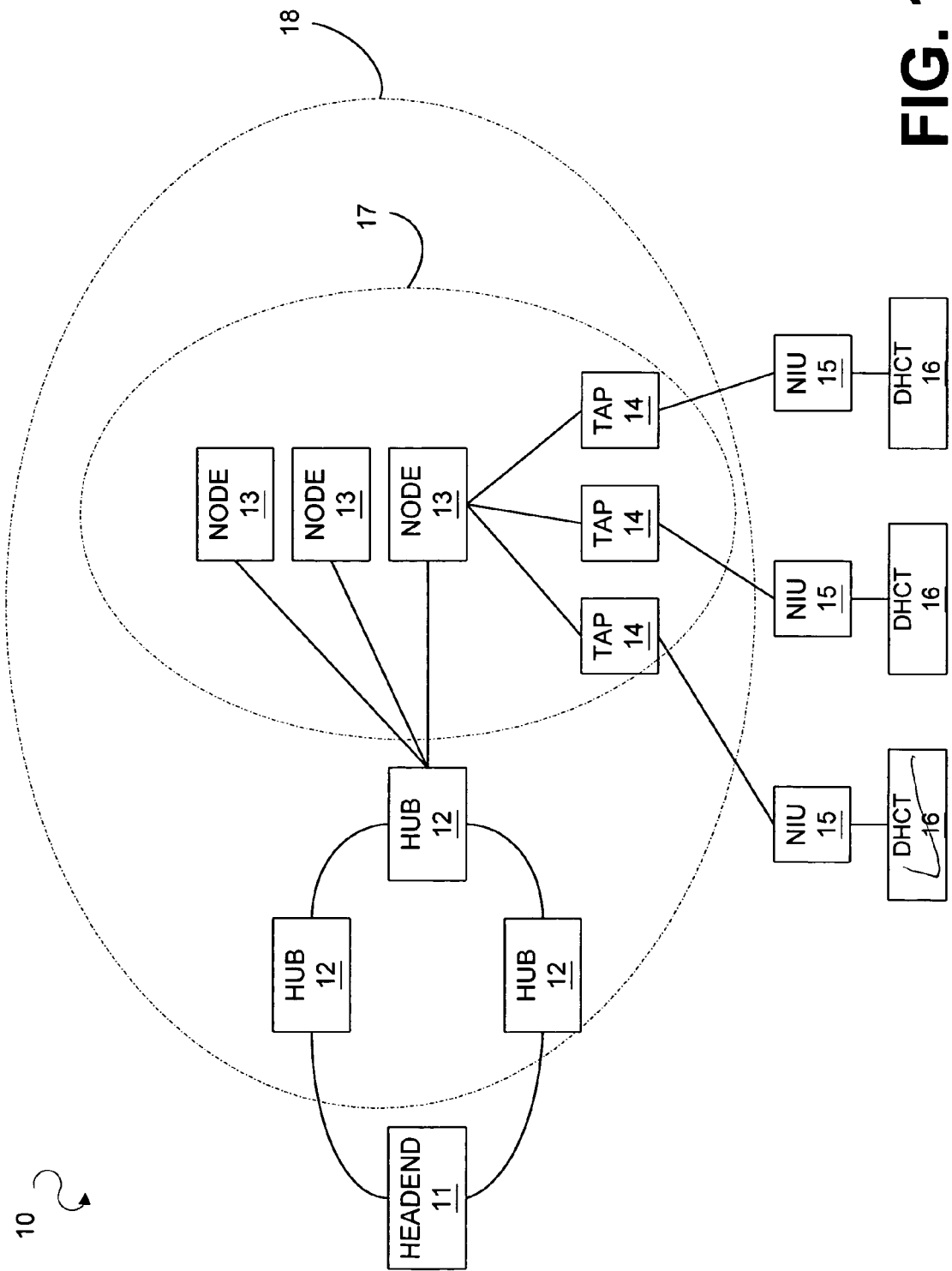
FIG. 1 is a block diagram of a cable television system in accordance with one preferred embodiment of the present invention.

The present invention is generally implemented as part of a cable television system (CTS). Hence, an illustrative CTS 10 and its operation will be described initially. FIG. 1 shows a block diagram view of a CTS 10, which is generally a high quality, reliable and integrated network system that features video, audio, voice and data services to DHCT users. Although FIG. 1 depicts a high level view of a CTS 10, it should be appreciated that a plurality of cable television systems can tie together a plurality of regional networks into an integrated global network so that DHCT users can receive content provided from anywhere in the world.

The CTS 10 delivers broadcast video signals as digitally formatted signals in addition to delivering traditional broadcast analog video signals. Furthermore, the system can support one way broadcast services as well as both one-way data services and two-way media and data services. The two-way operation of the network allows for user interactivity with services, such as Pay-Per-View programming, Near Video-On-Demand (NVOD) programming according to any of several known NVOD implementation methods, View-on-Demand (VOD) programming (according to any of several known VOD implementation methods), and interactive applications, such as Internet connections and interactive media Guide (IMG) applications.

The CTS 10 also provides the interfaces, network control, transport control, session control, and servers to access content and services, and distributes content and services to DHCT users. As shown in FIG. 1, a typical CTS 10 comprises a headend 11, hubs 12, an HFC access network 17, and users' digital home communication terminals (DHCTs) 16. It should be appreciated that although a single component (e.g. a headend) is illustrated in FIG. 1, a CTS 10 can feature a plurality of any one of the illustrated components or may be configured with alternative embodiments for any one of the individual components or with yet other additional components not enumerated above. A content provider (not shown) transmits media content to a headend for further transmission to users downstream in the network.

Content provided by a content provider is communicated by the content provider to one or more headends 11. From those headends the content is then communicated over a communications network 18 that includes a plurality of HFC access networks 17 (only one HFC access network 17 is illustrated). The HFC access network 17 typically comprises a plurality of HFC nodes 13, each of which may serve a local geographical area. The hub 12 connects to the HFC node 13 through a fiber portion of the HFC access network 17. The HFC node 13 is connected to a tap 14 which is connected to a network interface unit (NIU) 15 which is connected to a DHCT 16. The NIU 15 is normally located at a user's property and provides a transparent interface between the HFC node 13 and the users' internal wiring. Coaxial cables are typically used to couple nodes 13, taps 14 and NIUs 15 because the electrical signals can be easily repeated with radio frequency (RF) amplifiers.

As the high-level operations of many of the functions of CTSs 10 are well known to those of skill in the art, further description of the overall CTS 10 of FIG. 1 will not be contained herein. It will be appreciated, however, that the CTS 10 shown in FIG. 1 is merely illustrative and should not be construed as implying any limitations upon the scope of the present invention.

Figure 2:
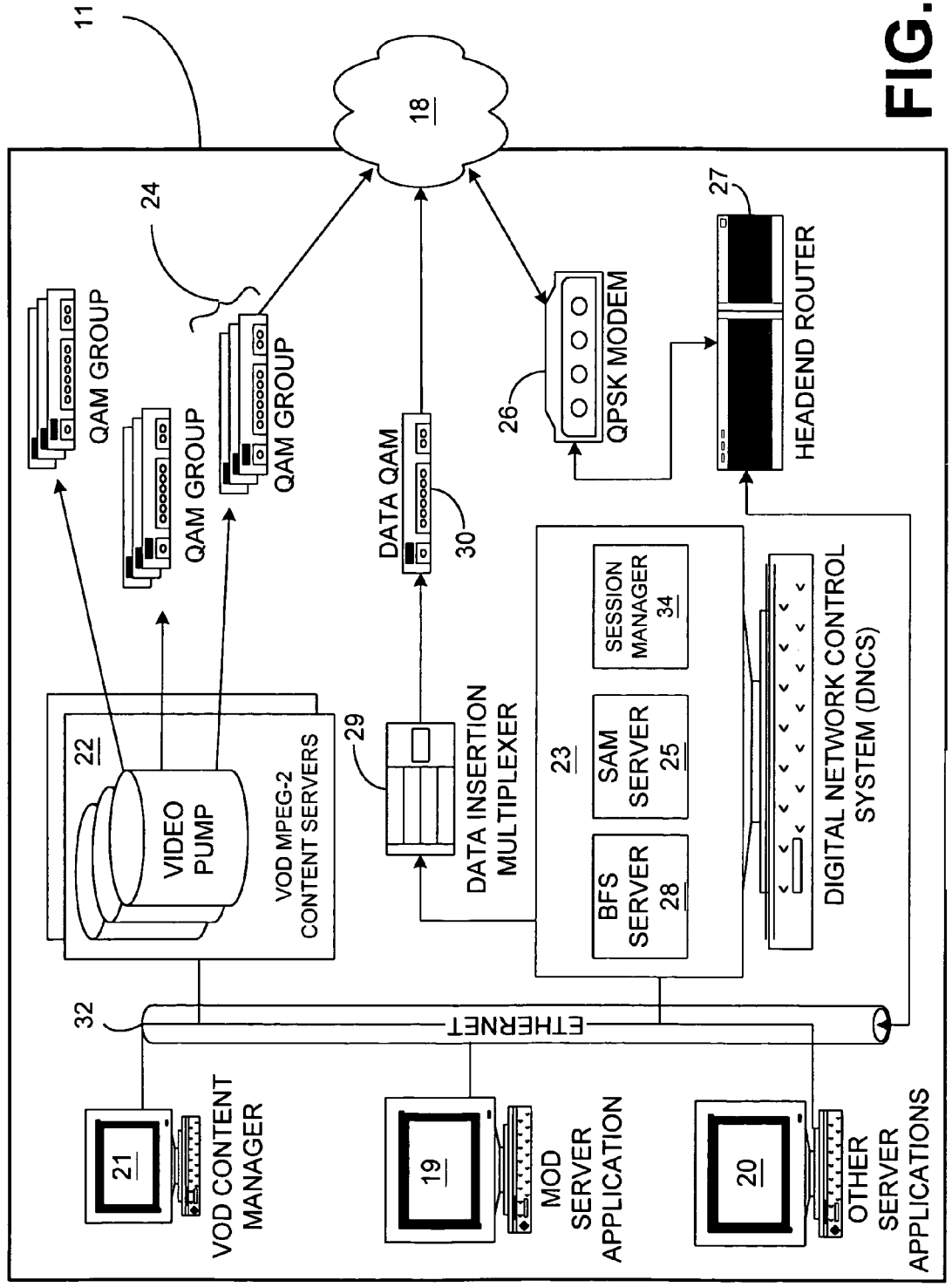
FIG. 2 is a block diagram of selected elements of the headend as depicted in FIG. 1.

FIG. 2 is a block diagram of portions of a headend 11 that is configured to provide media-on-demand (MOD) services in accordance with one embodiment of the present invention. MOD services include, among other things, video-on-demand (VOD) services and respective MOD information suitable to be presented to a user via display of an interactive media guide. MOD server application 19 and a plurality of other server applications 20 are connected to a digital network control system (DNCS) 23 via a high-speed network such as an Ethernet connection 32. The MOD server application 19 is responsible for reserving and configuring system resources needed to provide MOD services and for providing configuration and service data to an MOD client application 63 (FIG. 3), including MOD information comprising a catalog of titles available for on-demand viewing and/or on-demand rental by a user.

The DNCS 23 provides complete management, monitoring, and control of the network's elements and broadcast services provided to users. In one implementation, the DNCS 23 uses a data insertion multiplexer 29 and a data QAM 30 to insert in-band broadcast file system (BFS) data into an MPEG-2 transport stream that is broadcast and received via DHCT's communication interface 42 and tuner system 45. The DNCS 23 also contains a session manager 34 that uses Digital Storage Media Command and Control (DSMCC) protocol to set up and maintain MOD sessions. The session manager 34 processes user to network (U-N) session signaling messages, manages allocation of session-related network resources, supports network management operations, acts as a point of contact to the network for the DHCT's 16 in the network 18 to establish individual sessions, and supports MOD services by providing the signaling interface to establish, maintain and release client initiated exclusive sessions.

A service application manager (SAM) server 25 is a server component of a client-server pair of components, with the client component being located at the DHCT 16. Together, the client-server SAM components provide a system in which the user can access services, which are identified by an application to run and a parameter, such as particular data content, specific to that service. The client-server SAM components also manage the life cycle of the applications on the system, including the definition, activation, and suspension of services they provide and the downloading of the applications into the DHCT 16 as necessary.

Applications on both the headend 11 and the DHCT 16 can access the data stored in a broadcast file system (BFS) server 28 in a similar manner to a file system found on operating systems. The BFS server 28 is a part of a broadcast file system that has a counterpart BFS client module 43 (FIG. 3) in a DHCT 16 connected to the network 18. The BFS server 28 repeatedly sends data for applications on a data carousel (not shown) over a period of time in cyclical repeated fashion so that a DHCT 16 that is in need of reading any particular data file or parts thereof may receive it when requested by a user or one or more of its internal running processes.

A VOD content manager 21 is responsible for managing the content on the VOD content servers 22. The MOD server application 19 controls both the VOD content manager 21 and the VOD content servers 22 and utilizes them to help deliver the video and audio streams that make up VOD services. In one embodiment, an MOD content manager and MOD content servers (not shown) could run respectively in parallel to the VOD content manager 21 and VOD content servers 22 to manage other types of on-demand media content. In an alternate embodiment an MOD content manager replaces the VOD content manager 21 and the MOD content servers replaces the VOD content servers 22. The QAM modulators that comprise the QAM group 24 receive the MPEG-2 transport streams from the VOD content servers 22, convert them into encrypted RF signals at a specified frequency (channel), and transmit them to a DHCT 16 via the network 18.

The QPSK modem 26 is responsible for transporting the out-of-band IP (internet protocol) datagram traffic between the distribution headend 11 and a DHCT 16. Data from the QPSK modem 26 is routed by headend router 27 within the headend 11. The headend router 27 is also responsible for delivering upstream application traffic to the various server applications 19 & 20.

Figure 3:
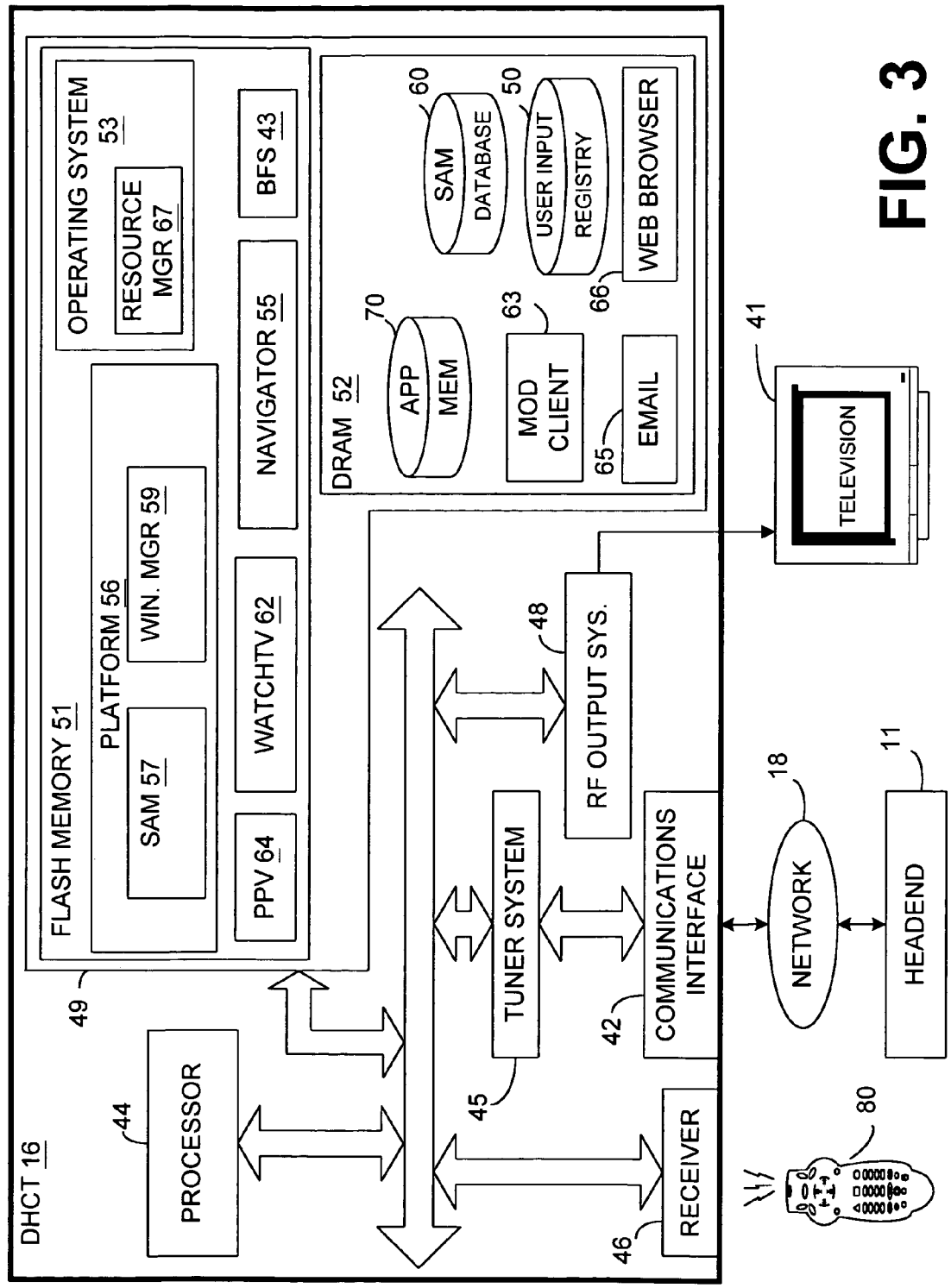
FIG. 3 is a block diagram of a DHCT and related equipment, in accordance with one preferred embodiment of the present invention depicted in FIG. 1.

FIG. 3 is a block diagram illustrating a DHCT 16 that is coupled to a headend 11 and to a television 41. Some of the functionality performed by applications executed in the DHCT 16 (such as the MOD client application 63) may instead be performed at the headend 11 and vice versa. A DHCT 16 is typically situated at a user's residence or place of business and may be a stand alone unit or integrated into another device such as, for example, a television set or a personal computer. The DHCT 16 preferably includes a communications interface 42 for receiving signals (video, audio and/or other data) from the headend 11 through the network 18 and for providing any reverse information to the headend 11 through the network 18. The DHCT 16 further includes at least one processor 44 for controlling operations of the DHCT 16, an RF output system 48 for driving the television display 41, and a tuner system 45 for tuning into a particular television channel to be displayed and for sending and receiving various types of data or media from the headend 11. The tuner system 45 includes, in one implementation, an out-of-band tuner for bi-directional quadrature phase shift keying (QPSK) data communication and a quadrature amplitude modulation (QAM) tuner for receiving television signals. Additionally, a receiver 46 receives externally-generated information, such as user inputs or commands from other devices.

The DHCT 16 may also include one or more wireless or wired interfaces, also called ports, for receiving and/or transmitting data to other devices. For instance, the DHCT 16 may feature USB (Universal Serial Bus), Ethernet (for connection to a computer), IEEE-1394 (for connection to media devices in an entertainment center), serial, and/or parallel ports. The user inputs may, for example, be provided by a computer or transmitter with buttons or keys located either on the exterior of the terminal or by a hand-held remote control device or keyboard that includes user-actuated buttons.

In one implementation, the DHCT 16 includes system memory 49, which includes flash memory 51 and dynamic random access memory (DRAM) 52, for storing various applications, modules and data for execution and use by the processor 44. Basic functionality of the DHCT 16 is provided by an operating system 53 that is primarily stored in flash memory 51. Among other things, the operating system 53 includes at least one resource manager 67 that provides an interface to resources of the DHCT 16 such as, for example, computing resources.

One or more programmed software applications, herein referred to as applications, are executed by utilizing the computing resources in the DHCT 16. Applications stored in flash memory 51 or DRAM 52 are executed by processor 44 (e.g., a central processing unit or digital signal processor) under the auspices of the operating system 53. Data required as input by an application is stored in DRAM 52 or flash memory 51 and read by processor 44 as need be during the course of the application's execution. Input data may be data stored in DRAM 52 by a secondary application or other source, either internal or external to the DHCT 16, or possibly anticipated by the application and thus created with the application at the time it was generated as a software application, in which case it is stored in flash memory 51. Data generated by an application is stored in DRAM 52 by processor 44 during the course of the application's execution. DRAM 52 also includes application memory 70 that various applications may use for storing and/or retrieving data.

An application referred to as navigator 55 is also resident in flash memory 51 for providing a navigation framework for services provided by the DHCT 16. The navigator 55 registers for and in some cases reserves certain user inputs related to navigational keys such as channel increment/decrement, last channel, favorite channel, etc. The client applications may be resident in flash memory 51 or downloaded into DRAM 52. The navigator 55 also provides users with television related menu options that correspond to DHCT functions such as, for example, providing an interactive program guide, blocking a channel or a group of channels from being displayed in a channel menu, and displaying a video-on-demand purchase list.

The flash memory 51 also contains a platform library 56. The platform library 56 is a collection of utilities useful to applications, such as a timer manager, a compression manager, a configuration manager, an HTML parser, a database manager, a widget toolkit, a string manager, and other utilities (not shown). These utilities are accessed by applications via application programming interfaces (APIs) as necessary so that each application does not have to contain these utilities. Two components of the platform library 56 that are shown in FIG. 3 are a window manager 59 and a service application manager (SAM) client 57.

The window manager 59 provides a mechanism for implementing the sharing of the screen regions and user input. The window manager 59 on the DHCT 16 is responsible for, as directed by one or more applications, implementing the creation, display, and de-allocation of the limited DHCT 16 screen resources. It allows multiple applications to share the screen by assigning ownership of screen regions, or windows. The window manager 59 also maintains, among other things, a user input registry 50 in DRAM 52 so that when a user enters a key or a command via the remote control device 80 or another input device such as a keyboard or mouse, the user input registry 50 is accessed to determine which of various applications running on the DHCT 16 should receive data corresponding to the input key and in which order. As an application is executed, it registers a request to receive certain user input keys or commands. When the user presses a key corresponding to one of the commands on the remote control device 80, the command is received by the receiver 46 and relayed to the processor 44. The processor 44 dispatches the event to the operating system 53 where it is forwarded to the window manager 59 which ultimately accesses the user input registry 50 and routes data corresponding to the incoming command to the appropriate application.

The SAM client 57 is a client component of a client-server pair of components, with the server component being located on the headend 11. A SAM database 60 in DRAM 52 includes a data structure of services and a data structure of channels that are created and updated by the headend 11. Many services can be defined using the same application component, with different parameters. Examples of services include, without limitation and in accordance with one implementation, presenting television programs (available through a WatchTV application 62), pay-per-view events (available through a PPV application 64), digital music (not shown), media-on-demand (available through an MOD application 63), and an interactive program guide. In general, the identification of a service includes the identification of an executable application that provides the service along with a set of application-dependent parameters that indicate to the application the service to be provided. As a non-limiting example, a service of presenting a television program could be executed with a set of parameters to view HBO or with a separate set of parameters to view CNN. Each association of the application component (tune video) and one parameter component (HBO or CNN) represents a particular service that has a unique service I.D. The SAM client 57 also interfaces with the resource manager 67, as discussed below, to control resources of the DHCT 16.

Application clients can also be downloaded into DRAM 52 at the request of the SAM client 57, typically in response to a request by the user or in response to a message from the headend. In this non-limiting example DRAM 52 contains a media-on-demand application (MOD) 63, an e-mail application 65, and a web browser application 66, among others (not shown). It should be clear to one with ordinary skill in the art that these applications are not limiting and merely serve as examples for this present embodiment of the invention. Furthermore, one or more DRAM based applications may, as an alternative embodiment, be resident in flash memory 51. These applications, and others provided by the cable system operator, are top level software entities on the network for providing services to the user.

In one implementation, applications executing on the DHCT 16 work with the navigator 55 by abiding by several guidelines. First, an application utilizes the SAM client 57 for the provision, activation, and suspension of services. Second, an application shares DHCT 16 resources with other applications and abides by the resource management policies of the SAM client 57, the operating system 53, and the DHCT 16. Third, an application handles situations where resources are only available with navigator 55 intervention. Fourth, when an application loses service authorization while providing a service, the application suspends the service via the SAM (the navigator 55 will reactivate an individual service application when it later becomes authorized). Finally, an application client is designed to not have access to certain user input keys reserved by the navigator (i.e., power, channel +/−, volume +/−, etc.).

The MOD client application 63 provides the user with lists of available media titles to choose from and with video presentations requested by the user. The MOD client application 63 provides video presentations to the user by engaging, preferably, in a direct two-way IP (Internet Protocol) connection with VOD content servers 22 (FIG. 2). The MOD client application 63 is also responsible for providing reminder and filing functionality as described below. In an alternative embodiment, the reminder and/or filing functionality is provided by a separate application that can be selectively aggregated to the MOD client application 63 for purposes of charging separately for that functionality.

An executable program or algorithm corresponding to an operating system (OS) component, or to a client platform component, or to a client application, or to respective parts thereof, can reside in and execute out of DRAM 52 and/or flash memory 51. Likewise, data inputted into or outputted from any executable program can reside in DRAM 52 or flash memory 51. Furthermore, an executable program or algorithm corresponding to an OS component, or to a client platform component, or to a client application, or to respective parts thereof, can reside in flash memory 51, or in a local storage device connected to DHCT 16 and be transferred into DRAM 52 for execution. Likewise, data input for an executable program can reside in flash memory 51 or a storage device and be transferred into DRAM 52 for use by an executable program or algorithm. In addition, data outputted by an executable program can be written into DRAM 52 by an executable program or algorithm and be transferred into flash memory 51 or into a storage device for storage purposes. The present invention is not limited by where or how data and/or applications are stored or retrieved.

Each of the above mentioned applications comprises executable instructions for implementing logical functions and can be embodied in any computer-readable medium for use by or in connection with an instruction execution system, apparatus, or device, such as a computer-based system, processor-containing system, or other system that can fetch and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner, and then stored in a computer memory.

Figure 4:
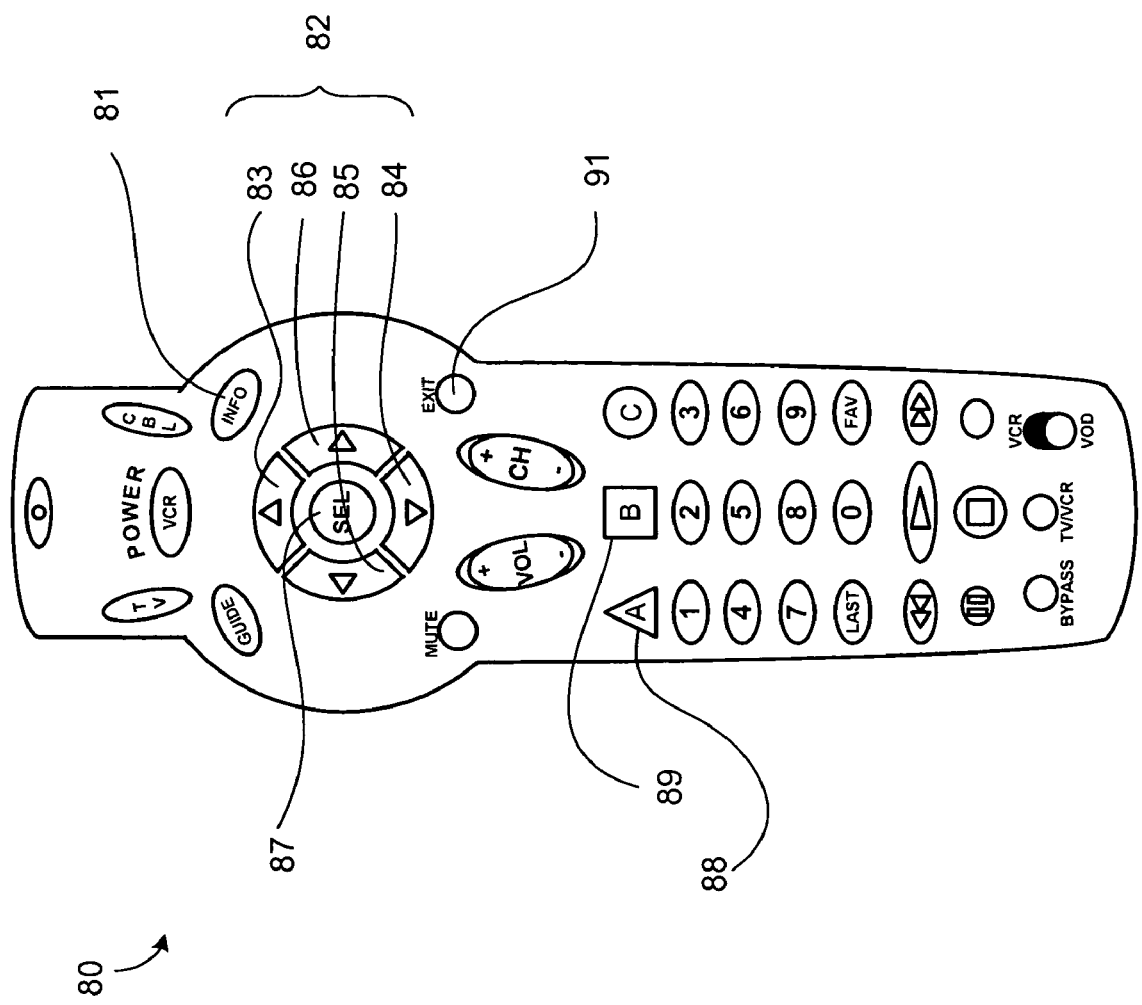
FIG. 4 is a block diagram of a remote control device that can be used to provide user input to the DHCT shown in FIG. 3.

FIG. 4 illustrates a non limiting example of a remote control device 80 that is used to provide user input to the DHCT 16. The arrow buttons 82 include an up arrow button 83, a down arrow button 84, a left arrow button 85, and a right arrow button 86 that are used to scroll through options and/or to highlight an option. The select button 87 may be used to select a currently highlighted option that is provided to the user. Other buttons that are available will be discussed further below. Many alternative methods of providing user input may be used including a remote control device with different buttons and/or button layouts, a keyboard device, a voice activated device, etc. The invention described herein is not limited by the type of device used to provide user input.

Figure 5:
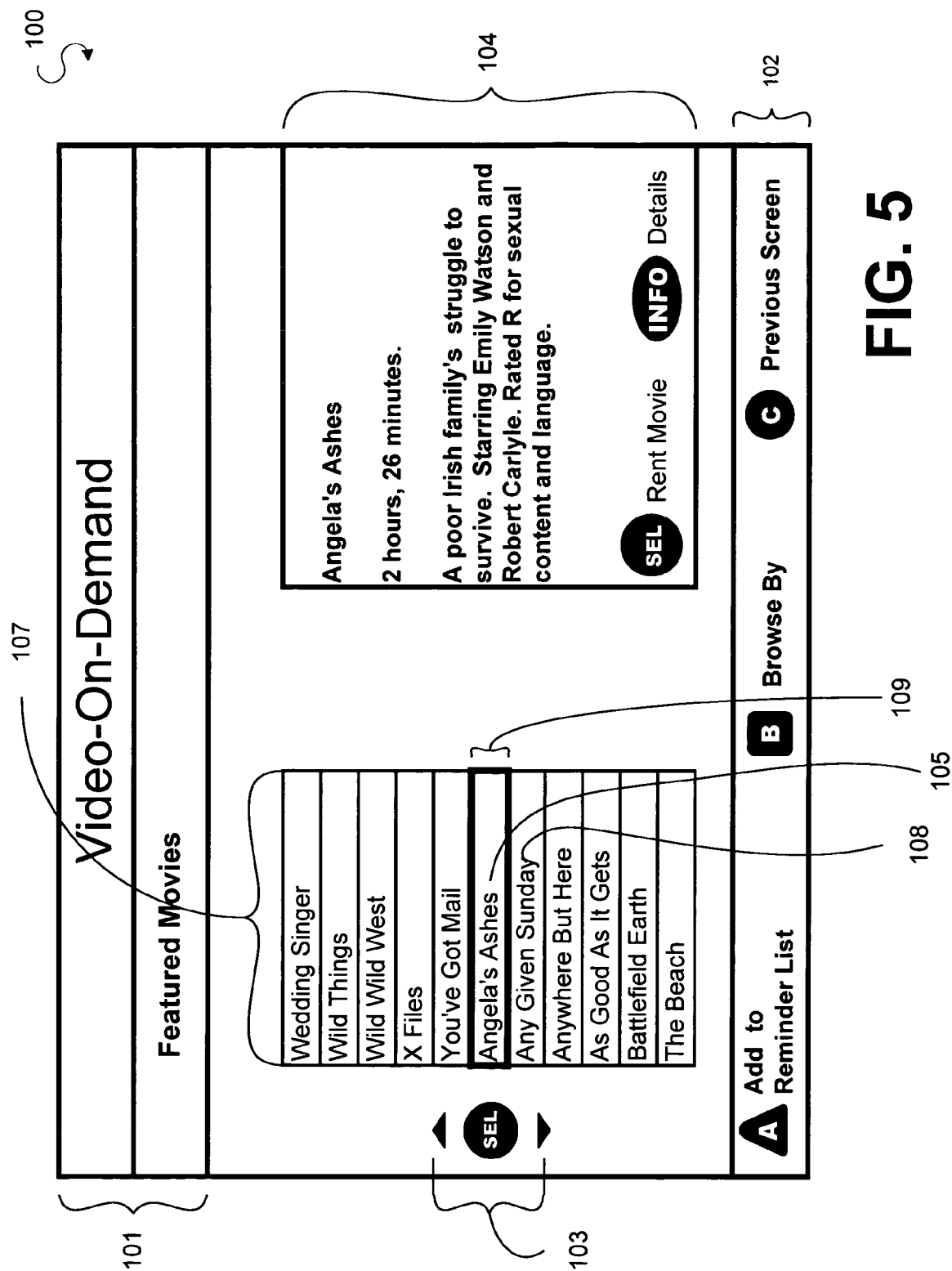
FIG. 5 is a diagram depicting an example rental selection window 100 that is presented to the user by the DHCT depicted in FIG. 3.

With continued reference to FIGS. 3 and 4 throughout the remaining figures, FIG. 5 shows an example media title selection window 100. As with other window examples discussed below, processor 44 executes program instructions of MOD client application 63 that cause it to direct the window manager 59 to create window 100 via display data that is formatted for television 41. Processor 44 stores the display data or parts thereof in DRAM 52 (as necessary) and transfers the display data to a display output system such as RF output system 48 wherein display data is converted to respective television signals and transmitted to television 41. Of course, the scope of the invention also includes any other method of causing the described windows to appear to the user.

The example window 100 contains a top portion 101 that typically contains one or more headings and a bottom portion 102 that typically illustrates relevant buttons available for activation with the input device by the user. Media titles list 107 contains media titles such as media title 108 and includes a highlighted title area 109. Information section 104 contains information related to the media title shown in the highlighted title area 109, which in this example is "Angela's Ashes" 105. The user may add a highlighted media title to a reminder list of titles 130 (FIG. 8) by activating the "A" button 88.

Browsing symbol 103 suggests to the user that the user may use the up and down arrow buttons 83, 84 to browse the media title list 107 and use the select button 87 to request the currently highlighted media title. For example the user may activate the down arrow button 84 in order to cause the media title "Any Given Sunday" 108 to be displayed in the highlighted title area 109 and then activate the select button 87 in order to request the movie "Any Given Sunday" 108. In an alternative embodiment, activating the up an down arrows would result in shifting the highlighted title area rather than shifting the media title list (at least until the top or bottom title is highlighted).

Figure 6:
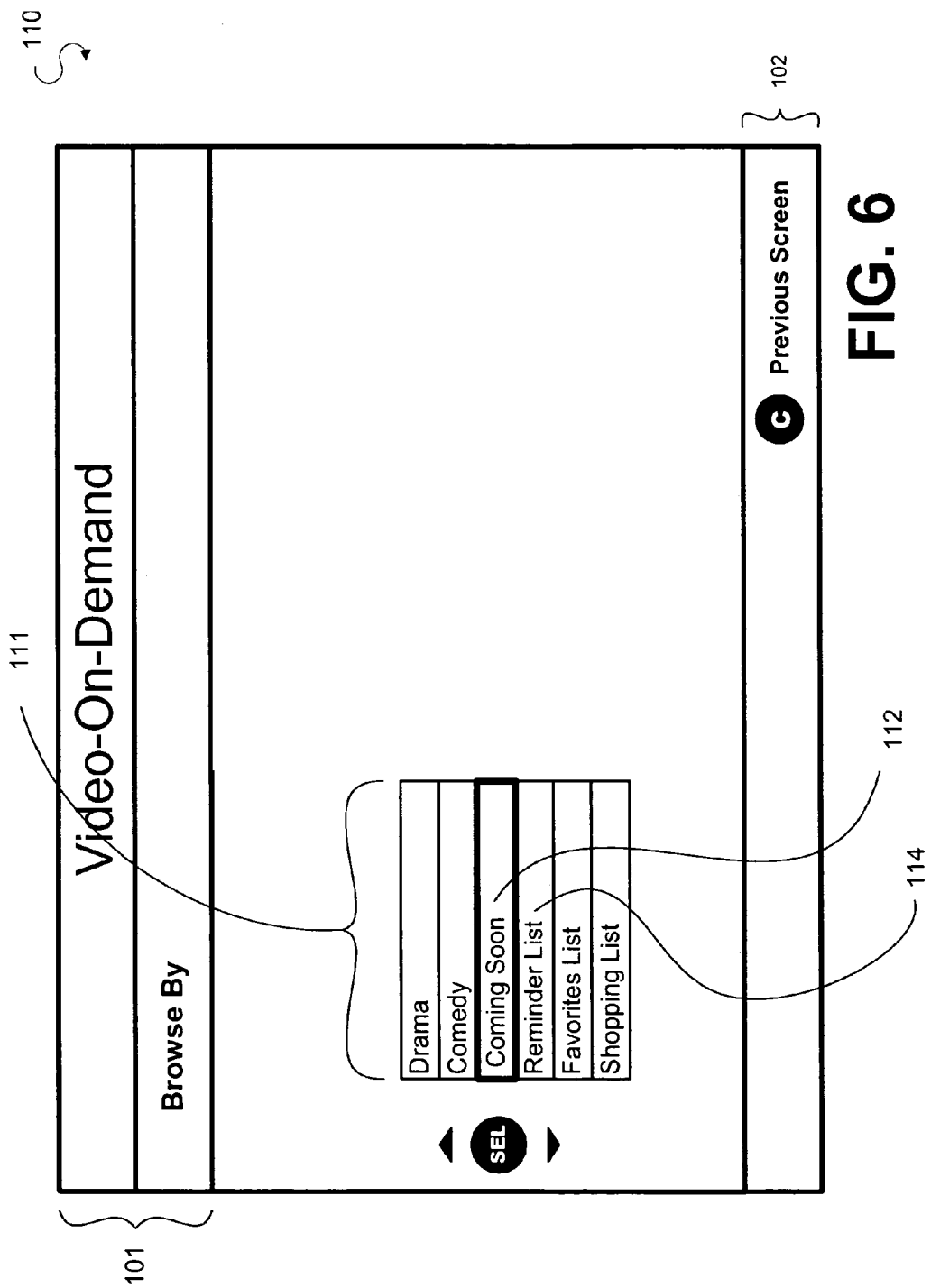
FIG. 6 is a diagram depicting an example browse-by window 110 that is presented to a user after the user activates a "B" button on the remote control device depicted in FIG. 4 while being presented with the rental selection screen depicted in FIG. 5.

FIG. 6 is a diagram depicting an example browse-by window 110 that is presented to a user after the user activates the "B" button 89 while being presented with media title selection window 100. Browse-by list 111 includes browse-by options such as options 112 and 114. A user may scroll through the browse-by list 111 and may select a browse-by option by using the remote control device 80 as described above. For example, the user may select the reminder list option 114 in order to access a reminder list 130 (FIG. 8) containing media titles which the user had selectively caused to be inserted into the list.

Figure 7:
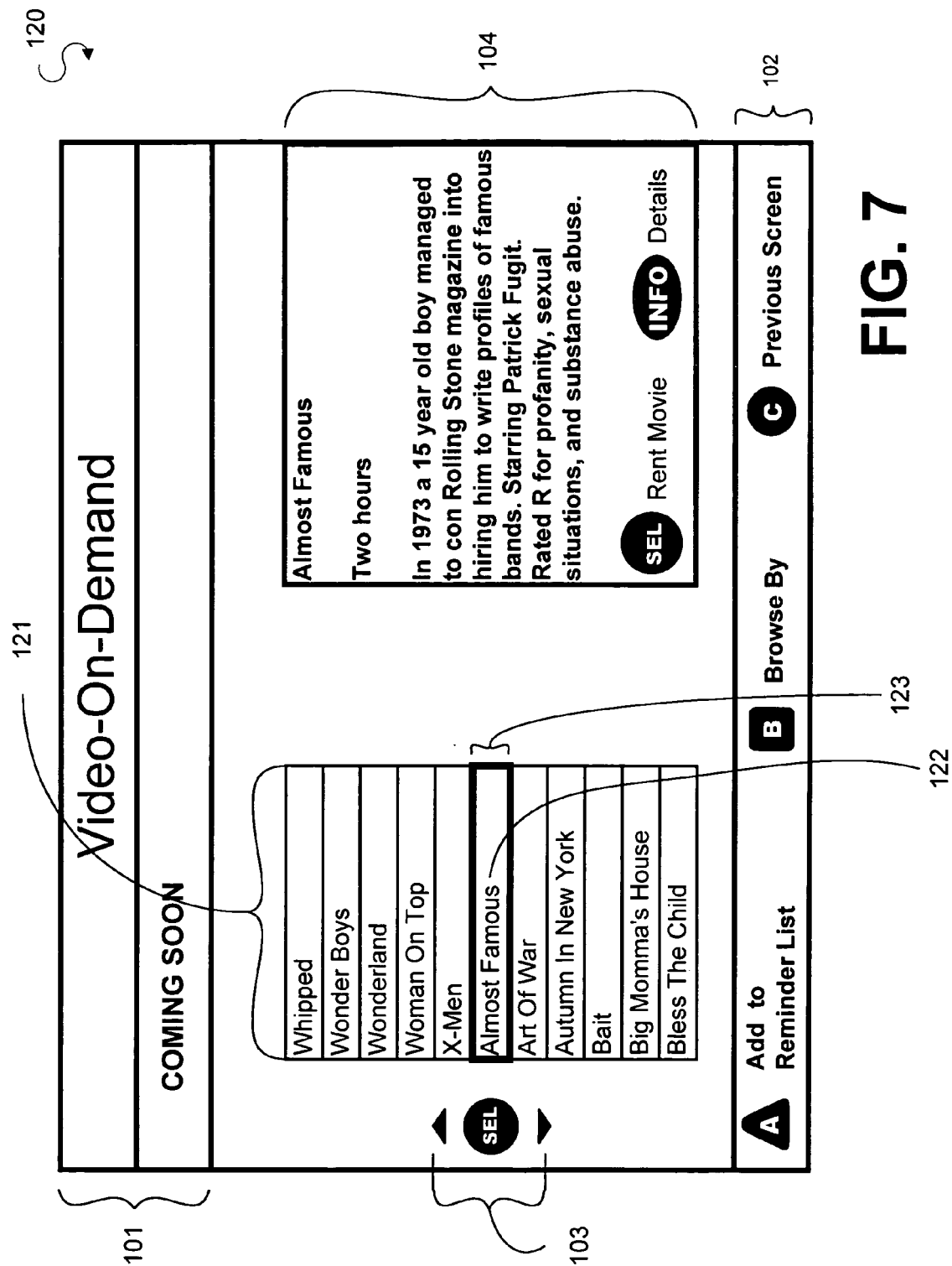
FIG. 7 is a diagram depicting an example future releases information window that is presented to a user after the user selects a "Coming Soon" option while being presented with the browse by screen depicted in FIG. 6.

FIG. 7 is a diagram depicting an example future releases information window 120 that is presented to a user after the user selects the "Coming Soon" option 112 while being presented with the browse by window 110. Media title list 121 contains media titles that will be available for rent at some time in the future. The content of media title list 121 is received from MOD server application 19 (FIG. 2) and stored by MOD client application 63 in application memory 70 from where it is retrieved as needed. Information section 104 contains information related to the media title shown in the highlighted title area 123, which in this example is "Almost Famous" 122. The user may add a highlighted media title to a reminder list 130 (FIG. 8) by activating the "A" button 88.

Figure 8:
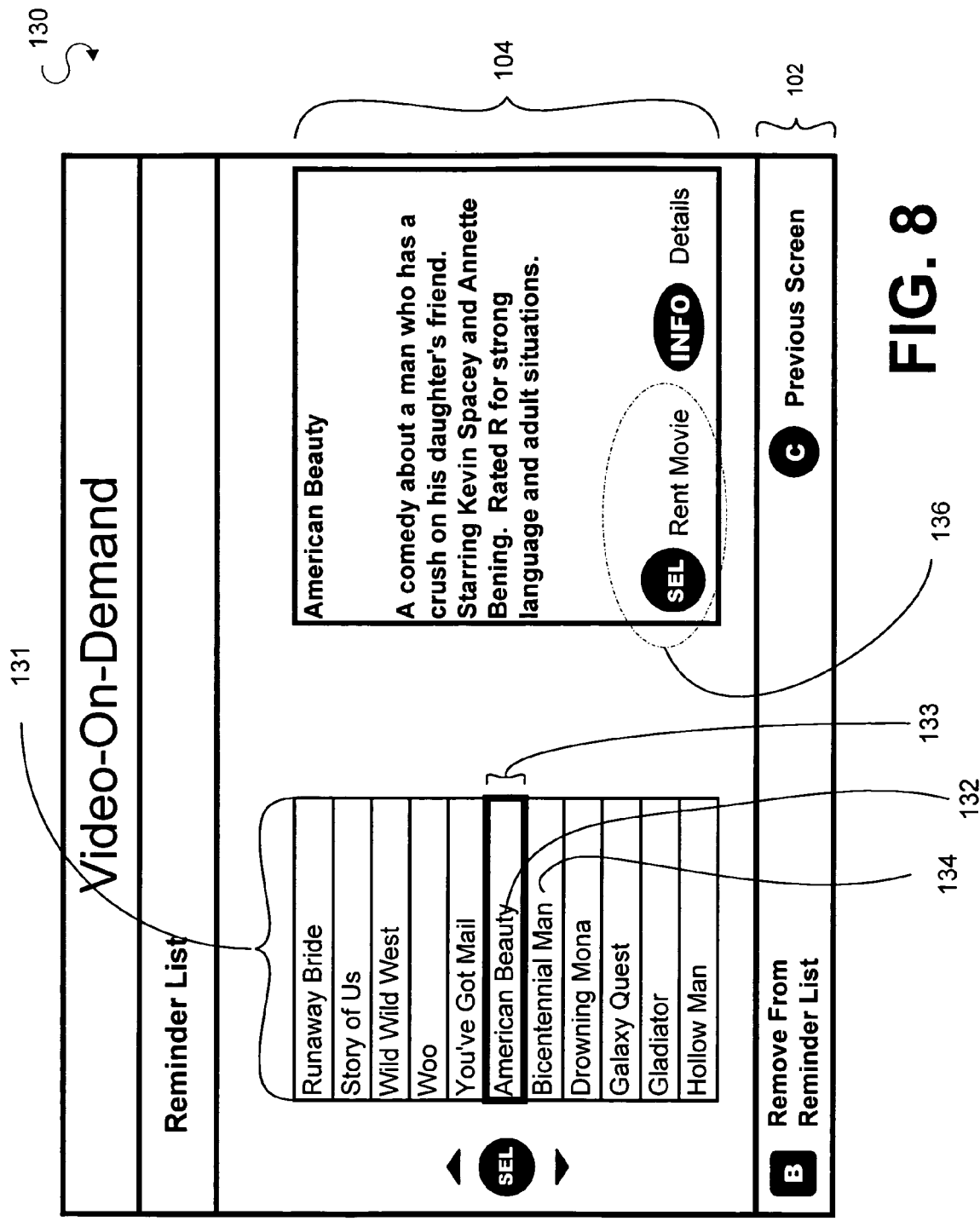
FIG. 8 is a diagram depicting an example reminder list screen that is presented to a user after the user selects a reminder list option while being presented with the browse-by screen depicted in FIG. 6.
Figure 9:
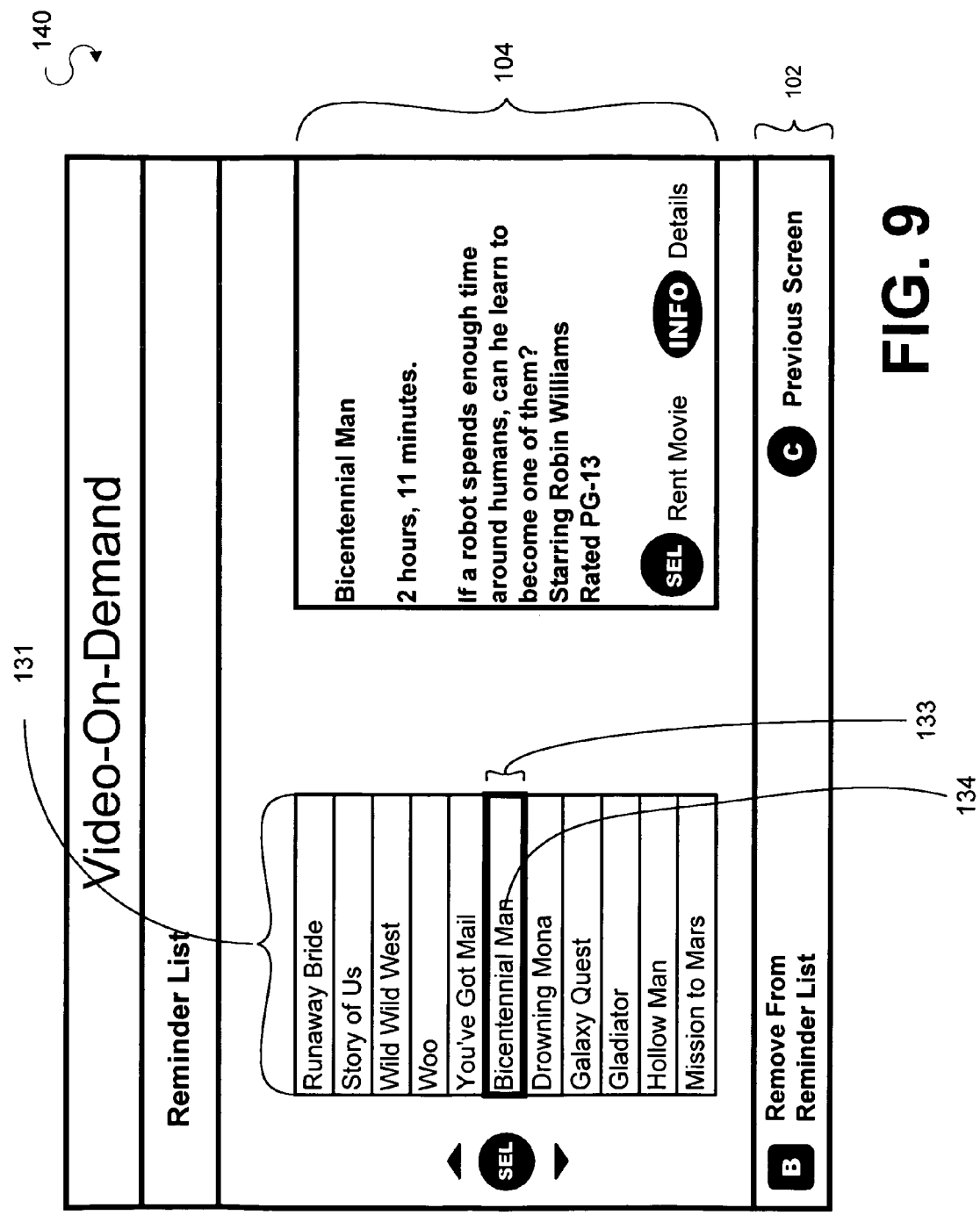
FIG. 9 illustrates the deletion of a media title from the reminder list depicted in FIG. 8.

FIG. 8 is a diagram depicting an example reminder list window 130 that is presented to a user after the user selects the reminder list option 114 while being presented with browse-by window 110. If the select symbol 136 is displayed in the information area 104, a user may request a currently highlighted media title by activating the select button 87. The user can request additional information about a highlighted media title by activating the "INFO" button 81. Upon the activation of the "B" button 89, the media title shown in the highlighted title area 133 is deleted and replaced by the next media title on the reminder list 131. In this example, the title "American Beauty" 132 would be deleted and replaced with the title "Bicentennial Man" 134 as illustrated in example window 140 in FIG. 9. Once a title is deleted from a reminder list, it remains excluded from such list even after the list is presented to the user at a later time. The user may however add a previously deleted title to the reminder title list by following the steps outlined above.

Figure 10:
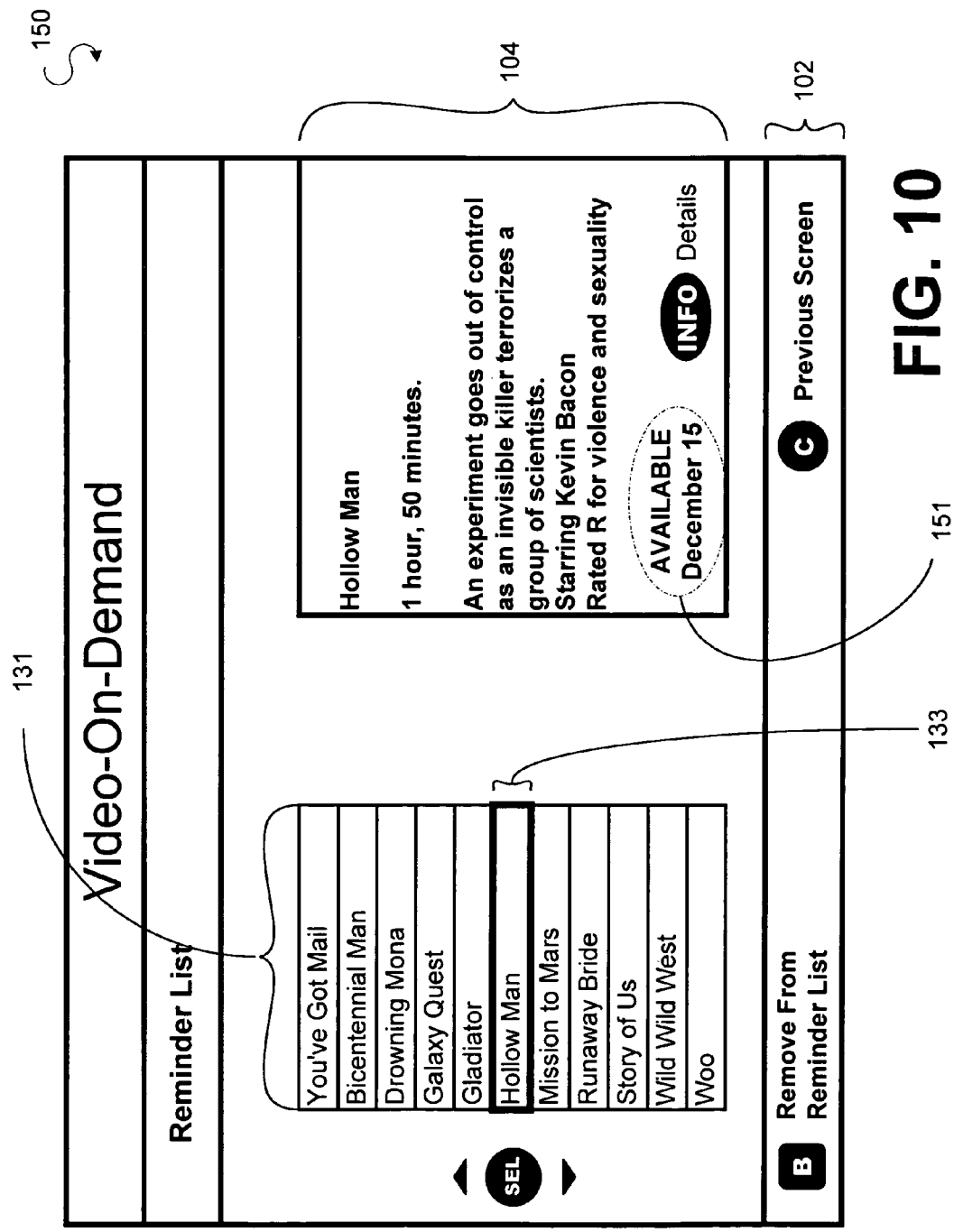
FIG. 10 is a diagram depicting an example reminder screen in which a currently highlighted media title is not yet available for rent.

FIG. 10 is a diagram depicting an example reminder window 150 in which the currently highlighted media title is not yet available for rent. An availability indicator 151 indicates to the user when such media title will become available. The user can request additional information about the media title by activating the "INFO" button 81 or may delete such title from the reminder list 131 by activating the "B" button 89. In an alternative embodiment, media titles belonging to a reminder list are separated into separate groups based on their respective availability. In yet another embodiment, media titles are separated into two distinct reminder lists, one for media titles available for viewing at current time and the other for media titles not yet available for viewing. In this latter case, the MOD client application 63 conducts the transfer of media titles as they become available from the latter reminder list to the former reminder list.

Figure 11:
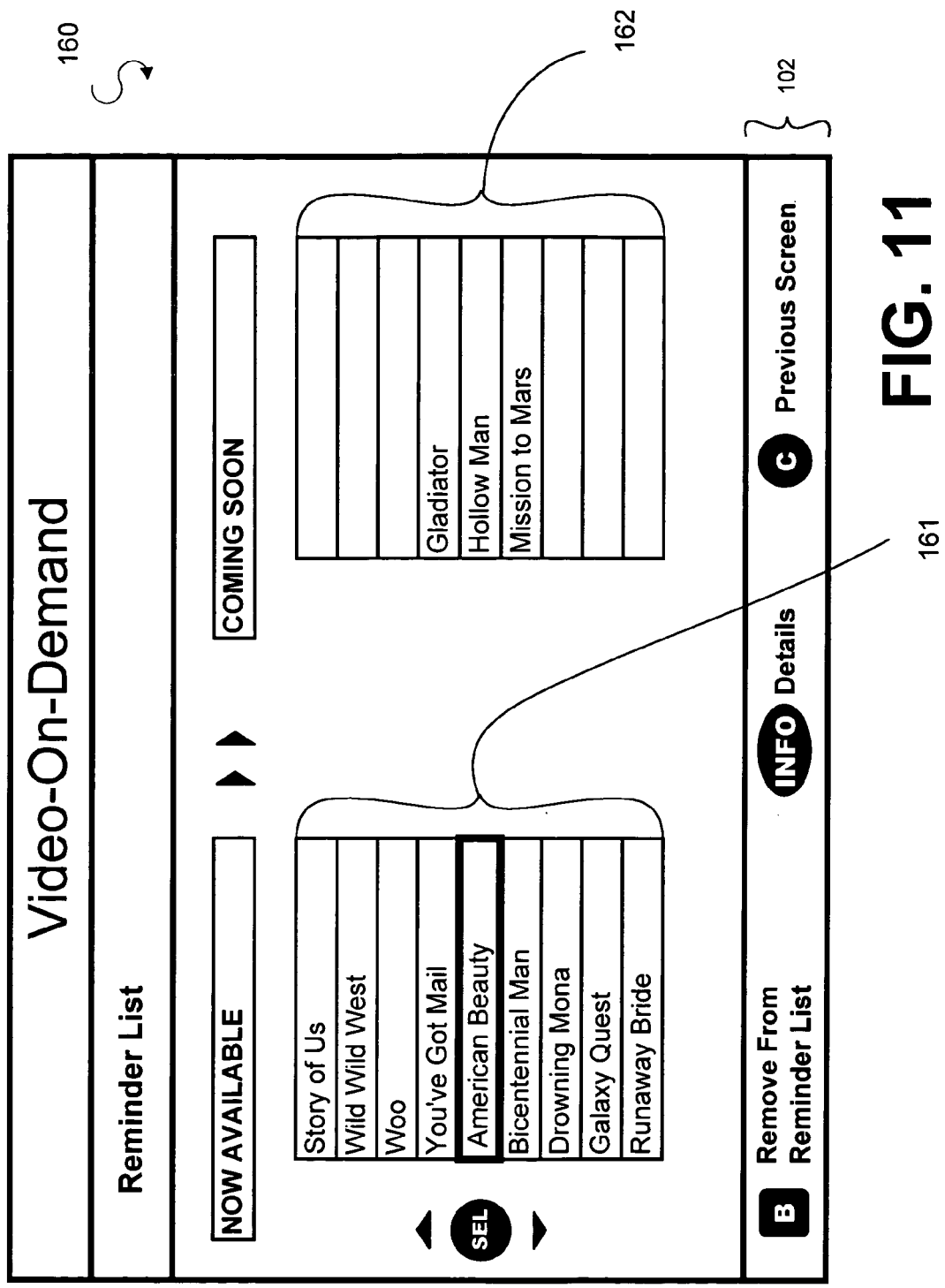
FIG. 11 is a diagram depicting an example reminder screen which illustrates an alternative embodiment to the reminder screen depicted in FIG. 8.
Figure 12:
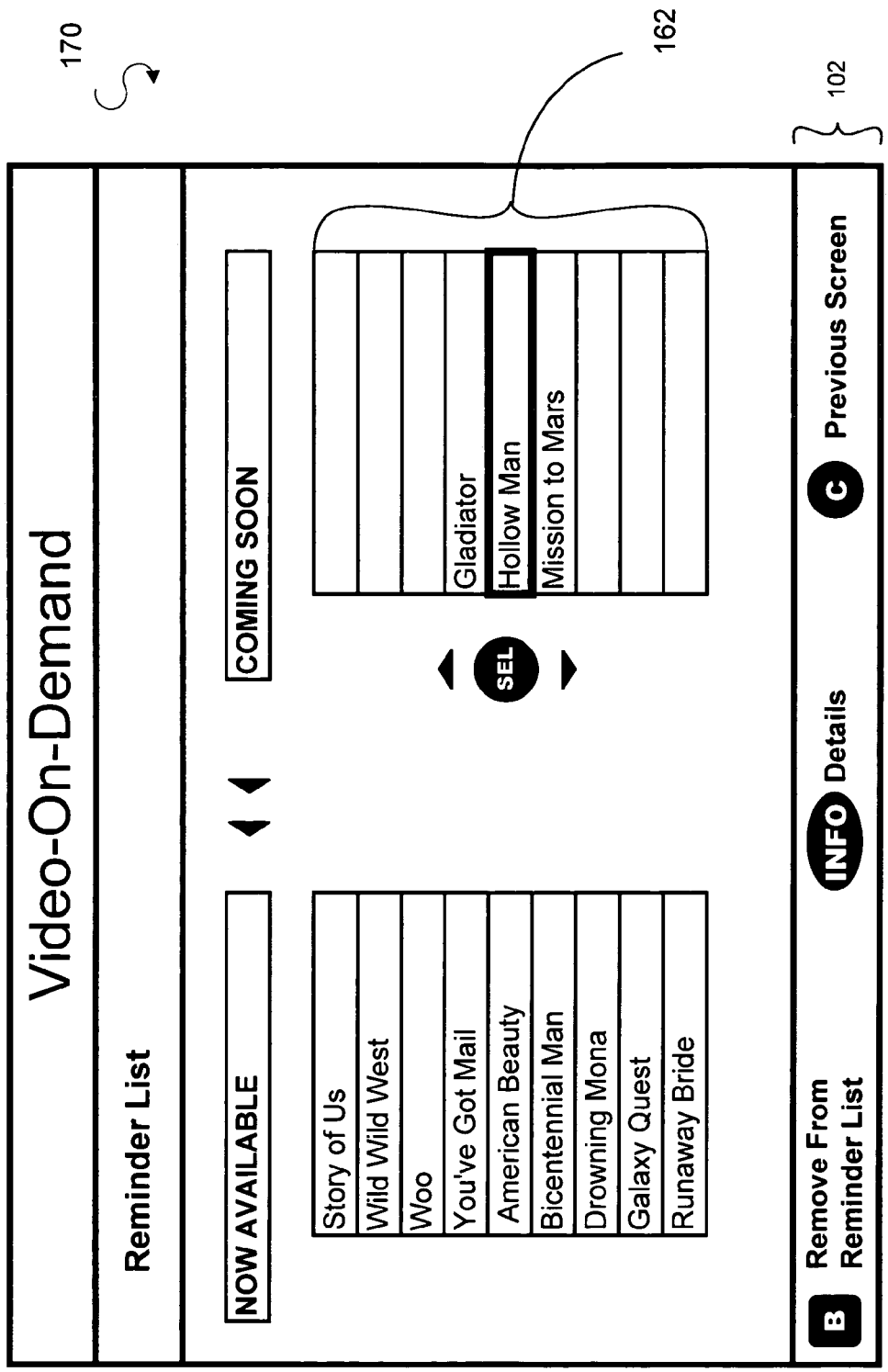
FIG. 12 depicts the reminder screen of FIG. 11 wherein a future releases media list is designated as the currently scrollable sub-list.

FIGS. 11 and 12 depict example reminder windows 160, 170 which illustrate an alternative embodiment to reminder window 130 shown in FIG. 8. In reminder windows 160 and 170, media titles that are inserted by a user into the reminder list are grouped into sub-lists based on their respective availability. An available media titles sub-list 161 contains media titles that are currently available for rent, whereas a future media releases sub-list 162 contains media title that will be available some time in the future. A user can designate a media sub-list as the currently scrollable media sub-list by using the left and right arrow buttons 85, 86. For example, a user may activate the right arrow 86 while being presented with reminder window 160 in order to designate the future media releases sub-list 162 as the currently scrollable sub-list as illustrated in reminder window 170 in FIG. 12. A currently designated media sub-list contains a highlighted media title. A user may request a currently highlighted media title from the available titles sub-list 161 by activating the select button 87 or a user may view additional information about a highlighted media title from either sub-list by activating the "INFO" button 81.

Figure 13:
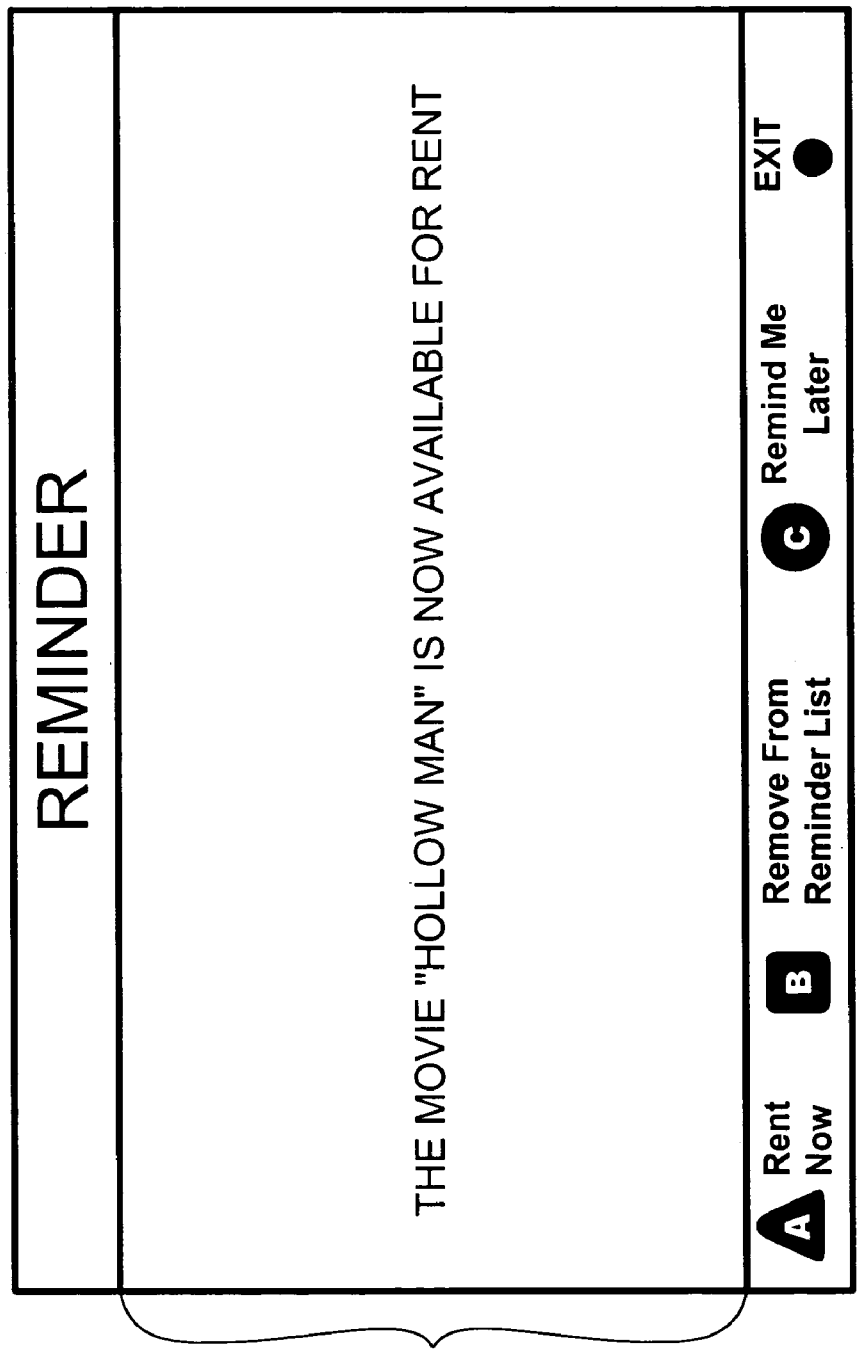
FIG. 13 is a diagram depicting an example reminder barker that informs the user that a media title that is part of the reminder list depicted in FIG. 8 has become available for rent.
Figure 14:
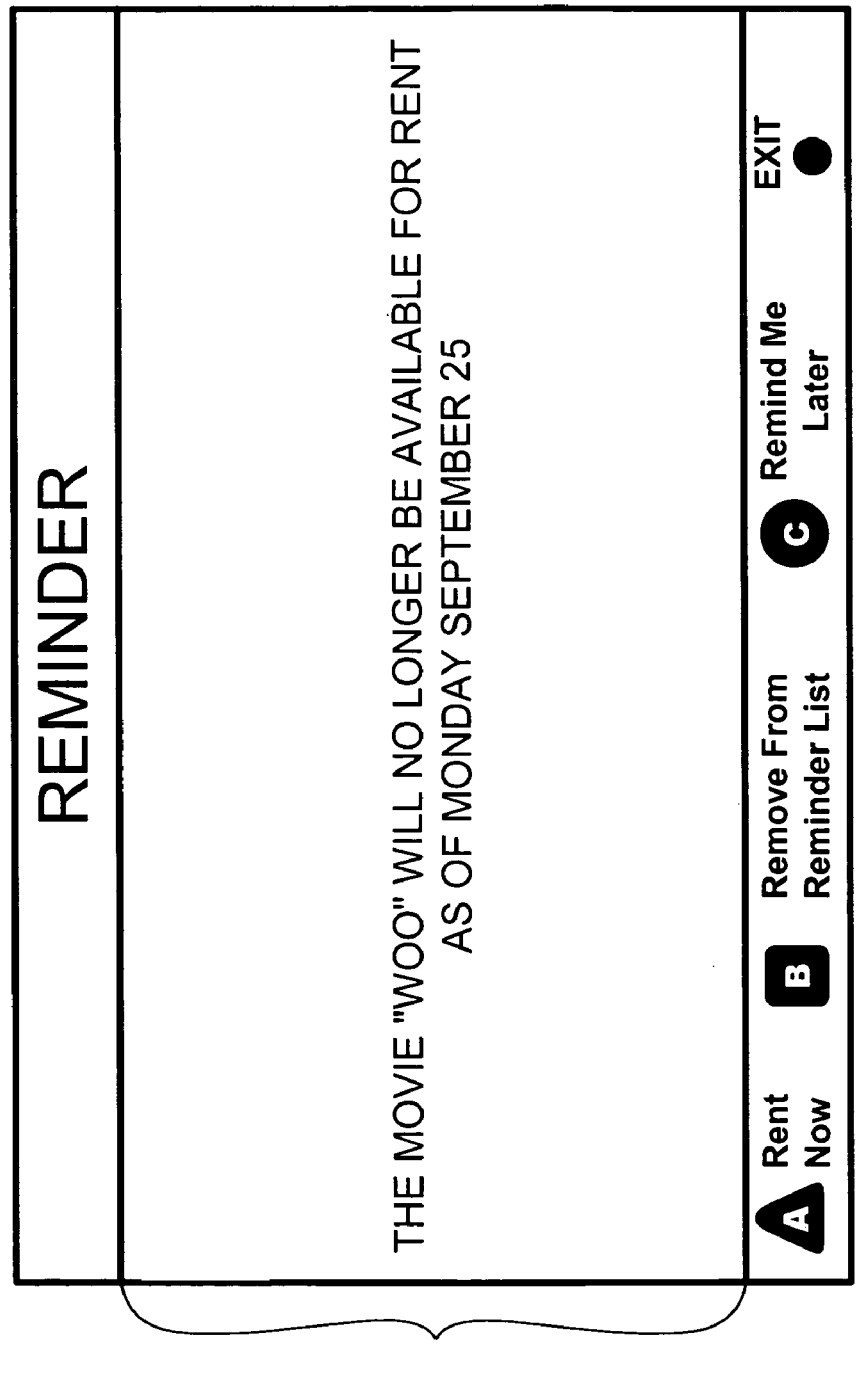
FIG. 14 is a diagram depicting an example reminder barker that informs the user that a media title that is part of the reminder list depicted in FIG. 8 will no longer be available for rent.

FIGS. 13 and 14 depict example reminder barkers 180 and 190 that are presented to a user in order to remind the user of aspects pertaining to media titles belonging to a reminder list. A reminder barker may be presented to a user, for example, when the user accesses a rental selection screen or a reminder list screen. A message displayed in central portion 183 of reminder barker 180 informs the user that a media title that is part of reminder list 131 (FIG. 8) has become available for rent. A message displayed in the center portion 183 of reminder barker 190 informs the user that a media title that is part of reminder list 131 will no longer be available for rent as of a certain date. When presented with either barker, the user may activate the "A" button 88 in order to rent the media title shown in central portion 183, the "B" button 89 in order to remove the media title from the reminder list, the "C" button in order to receive the reminder at a later time, or the "EXIT" button 91 in order to remove the reminder barker from the television screen.

Figure 15:
FIG. 15 is a diagram depicting an end of rental barker that is presented to a user at the end of a media rental that is included in the reminder list depicted in FIG. 8.

FIG. 15 depicts an end of rental barker 200 that is presented to a user at the end of a media rental that is included in the reminder list 131 (FIG. 8). A message displayed in center portion 183 asks the user if the user would like to keep the media title as part of the reminder list 131. The user may activate the "A" button 88 in order to keep the media title as part of the reminder list 131, or the "B" button 89 in order to remove the media title from the reminder list 131. Alternatively, the user may configure the MOD client application 63 via an interactive presentation of configuration windows to permanently remove titles from the reminder list after consumption.

In addition to a reminder list, other designated lists or containers may be set up a priori for other designated functionality. For example, a shopping list may serve as a designated container into which a user may selectively insert media titles during a media-on-demand selection session as discussed below. A user can place media titles in the shopping list as candidates for the current on-demand selection session. Hence, a user can scout the media title list for other media titles while inserting and retaining one or more media titles in the shopping list during the current on-demand selection session. Upon coalescing a set of media titles into the shopping list, the user reviews the titles in the shopping list and makes a final selection for on-demand viewing as described below.

Figure 16:
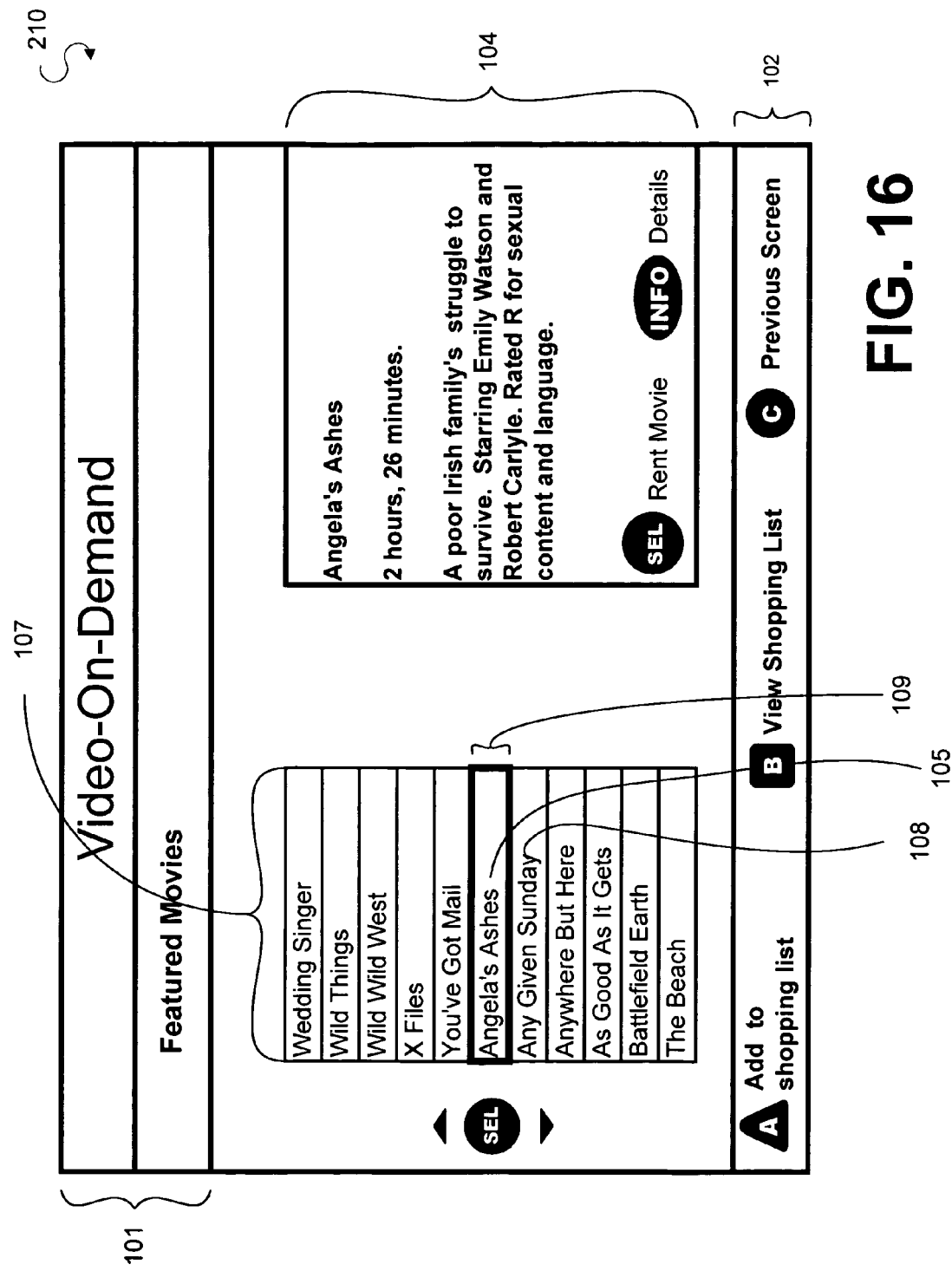
FIG. 16 depicts a media title selection window that is an alternative embodiment to the selection window depicted in FIG. 5.
Figure 17:
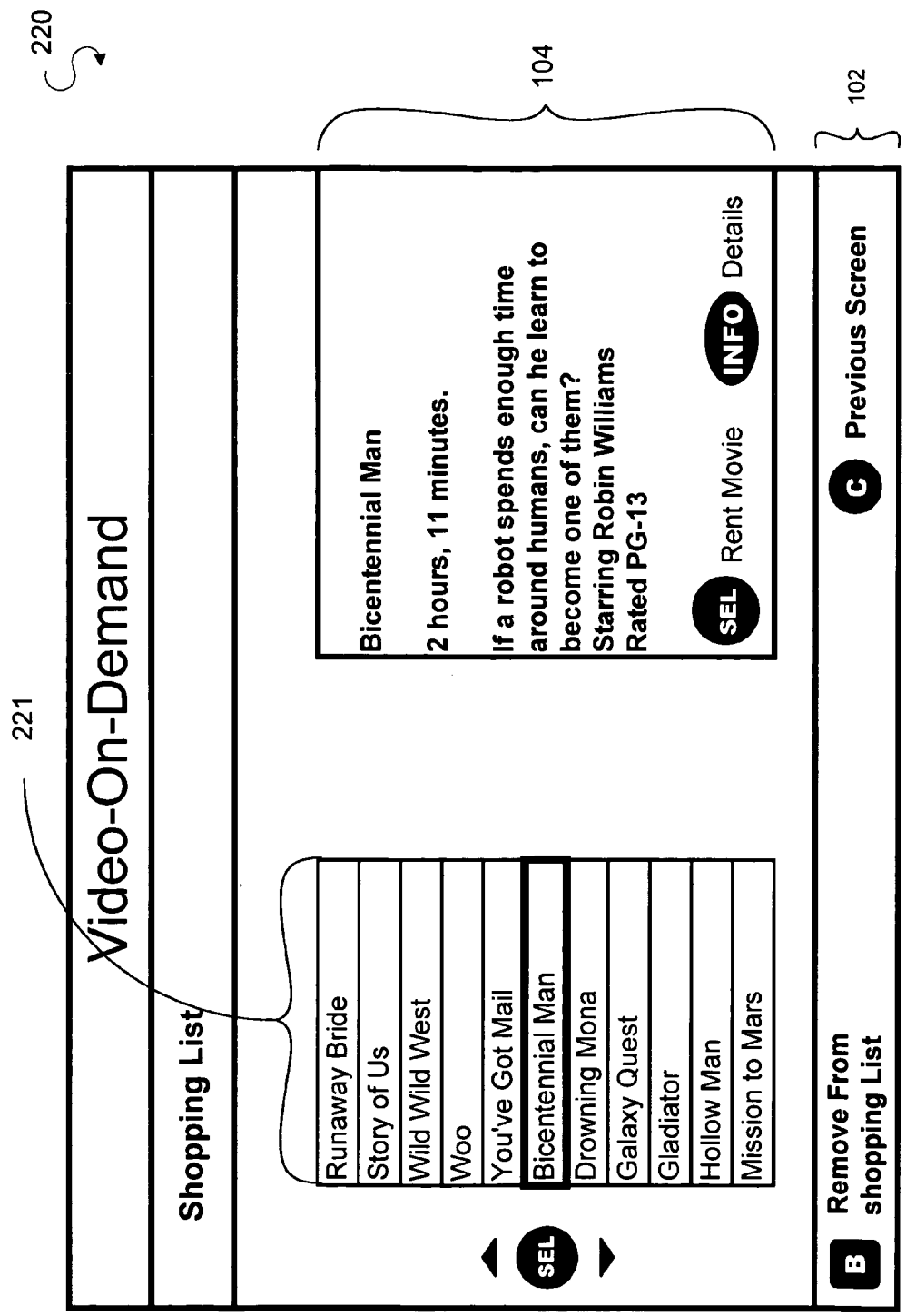
FIG. 17 depicts a shopping list window that is presented to a user after the user requests to view a shopping list while being presented with the media title selection window depicted in FIG. 16.
Figure 18:
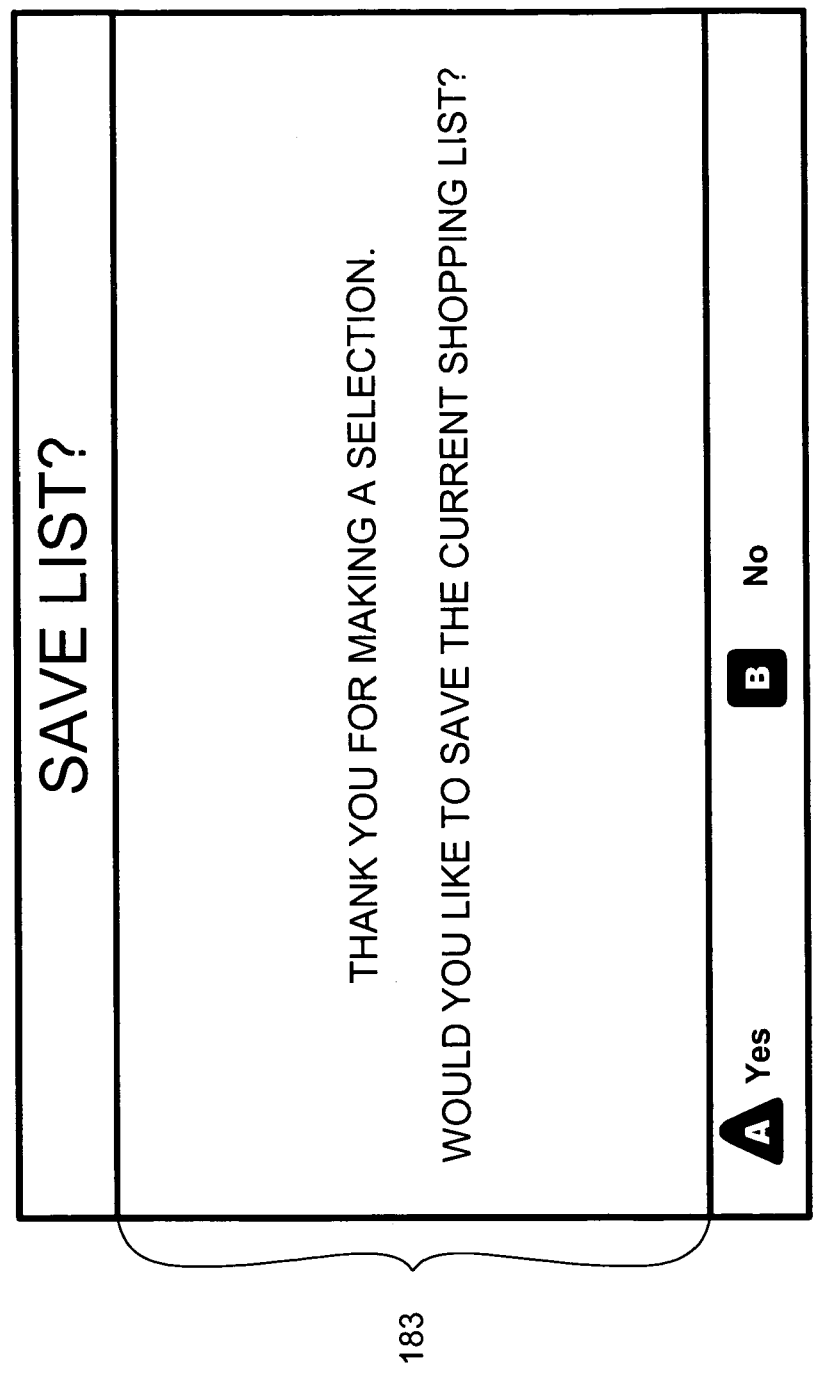
FIG. 18 depicts a "save list" barker that is presented to a user after the user requests a media title while being presented with the shopping list window depicted in FIG. 17.

FIG. 16 depicts an alternative embodiment to the media title selection window 100 depicted in FIG. 5. Media title selection window 210 differs from media title selection window 100 in that window 210 suggests to the user that the user may use the "A" button 88 to add a currently highlighted title to a shopping list and the "B" button 89 to access the shopping list 221 as illustrated in FIG. 17. FIG. 17 depicts a shopping list window 220 that is presented to a user after the user activates the "B" button 89 while being presented with the media title selection window 210. A user may request a currently highlighted media title by activating the select button 87 or may request additional information about a highlighted media title by activating the "INFO" button 81. Upon the activation of the "B" button 89, a currently highlighted media title is deleted and replaced by the next media title on the shopping list 221. Upon activating the select button 87 a "save list" barker 230 is presented to the user as illustrated in FIG. 18. center portion 183 of the "save list" barker 230 contains a message prompting the user for input as to whether the user would like the current shopping list to be saved. The user may activate the "A" button 88 to save the shopping list 221 or the "B" button 89 in order to delete the contents of the shopping list 221.

Figure 19:
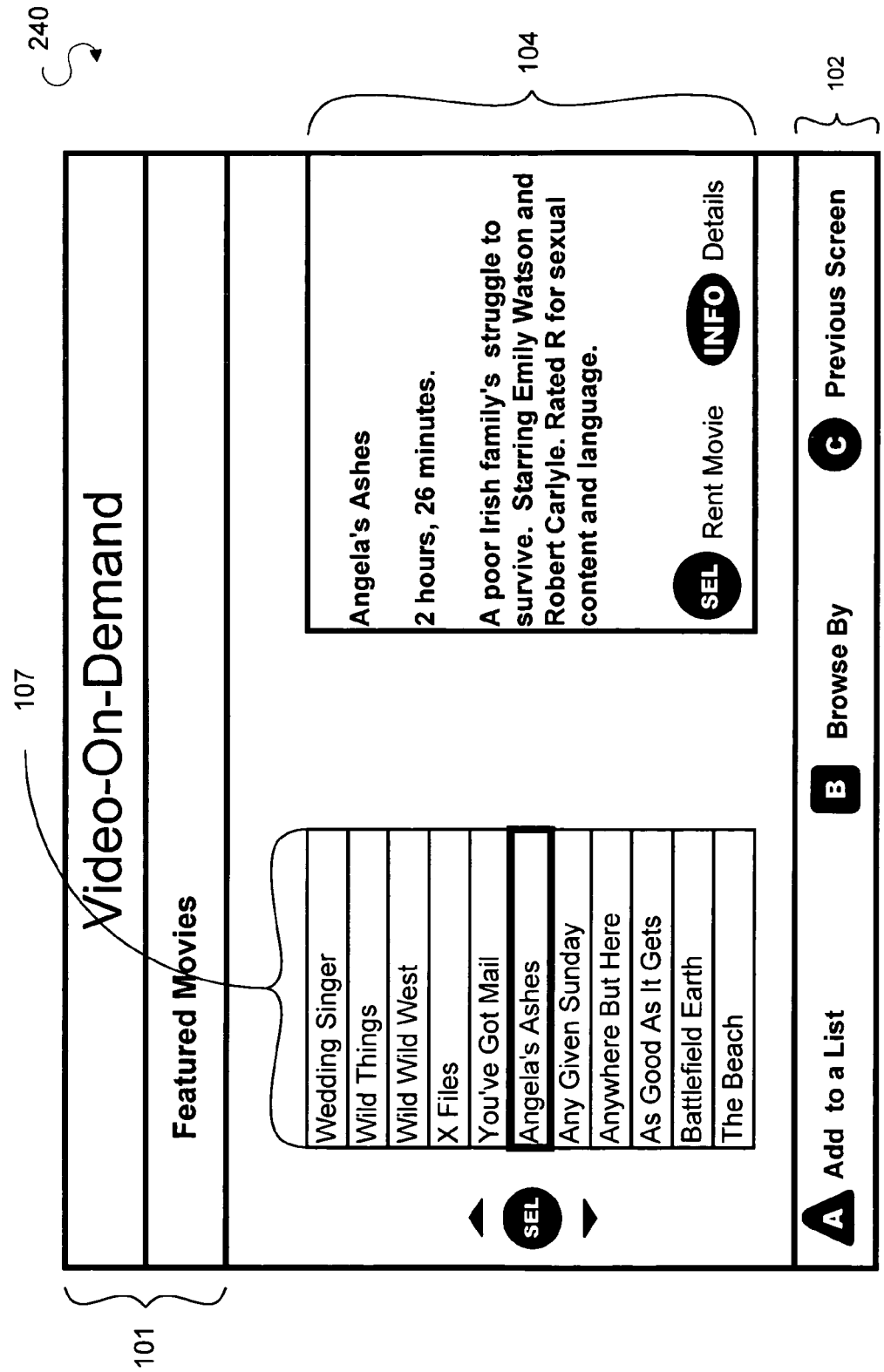
FIG. 19 depicts a media title selection window that is an alternative embodiment to the selection window depicted in FIG. 16.
Figure 20:
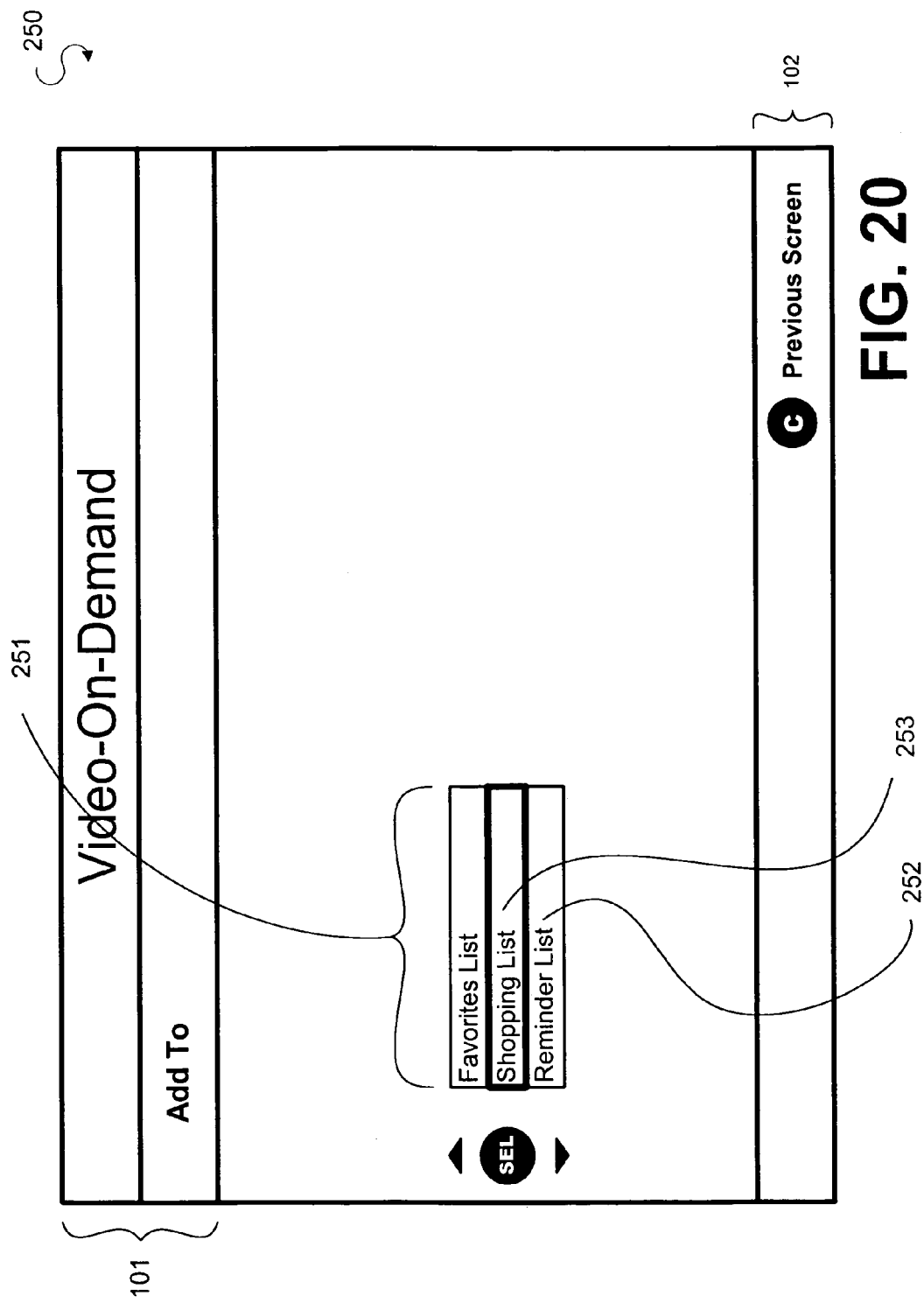
FIG. 20 depicts a list selection window that is presented to the user after the user requests the addition of a media title to a list while being presented with the media selection window depicted in FIG. 19.

FIG. 19 depicts an alternative embodiment to the media title selection window 210 depicted in FIG. 16. Media title selection window 240 differs from media title selection window 210 in that window 240 suggests to the user that the user may use the "A" button 88 to add a currently highlighted title to a yet undetermined list and the "B" button 89 to access a browse-by list as discussed above. FIG. 20 depicts a list selection window 250 that is presented to the user after the user activates the "A" button 88 while being presented with media title selection window 240. A selection list 251 contains list selections such as a reminder list selection 252 and a shopping list selection 253. The user can use the remote control device 80 in order to specify a list for storing the highlighted media title selected via media title selection window 240. After the user makes a selection, the user is presented once again with media title selection window 240. A user may access a desired list by activating the "B" button 89 and then selecting a list from the browse-by list 110 (FIG. 6).

In one embodiment, each individual viewer or member of a family has a respective personalized reminder list and/or shopping list that is titled with an alphanumeric string selected by the respective viewer. A list may simply be titled with a suffix or prefix number or letter which individual viewers appropriate under personal agreement between themselves, or the titles may be input by users with input devices such as keyboards or remote control devices. In yet another embodiment multiple designated reminder lists, each titled with a different media category (such as comedy, drama and adventure) are available to users for filing media titles. Likewise, designated reminder lists may be available for filing media titles according to their respective ratings.

Figure 21:
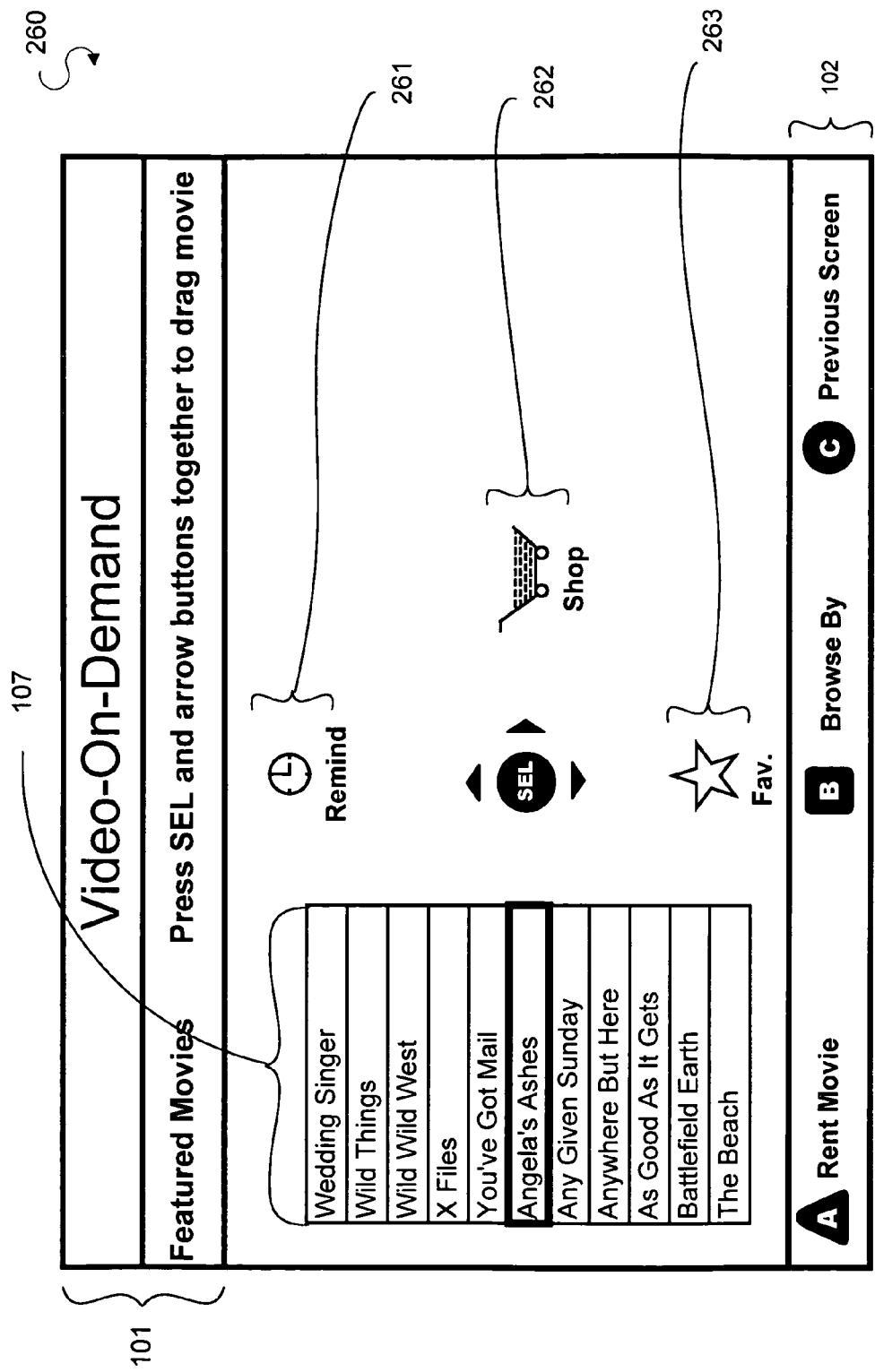
FIG. 21 depicts a media title selection window that is an alternative embodiment to the selection window depicted in FIG. 5.

In an alternative embodiment, a set of distinct functional title lists exist, each having a respective small icon representation as illustrated in FIG. 21. Each distinct icon is a small visual color image with a short text string that suggests the functionality of the respective title list. A media title selection list functionality is enhanced by displaying the small representative icons, such as for example icons 261, 262, and 263, inside the perimeter of the media selection window 260. The input device and MOD client application 63 further comprises "drag and drop" functionality whereby a highlighted media title is dragged and "dropped" into an icon. The drag and drop functionality is initiated by the user activating the select key 87 continuously and simultaneously pressing one of the four arrow keys 82. While continuing to push the select key 87, the user presses a sequence of arrow keys 82 according to where the desired icon is located on the screen. For instance, if the desired icon is shopping list icon 262, the user can drag a highlighted media title in that direction by pressing the right arrow key 86 while continuing to hold down the select key 87. The window 260 is updated with a representative movie icon (not shown) in motion across the screen as the user performs the drag operation via continual arrow key presses. Once the dragged media title reaches the spatial domain of the desired title list's icon, the displayed icon is dimmed (made darker) by MOD client application 63 to visually indicate to the user that the currently dragged media title (depicted on the screen to the user with a movie icon) has penetrated sufficiently into the icon's real-estate and can be dropped in. Hence, if the user decides to drop the dragged media title into the title list of the representative icon, the user ceases the press of select key 87 and the media title is inserted into the respective title list.

In one embodiment, a designated or user-created list comprises a set of "list entries" that are stored along with a set of attributes for each respective list entry in application memory 70 of DRAM 52 or read-write non-volatile memory (not shown) of DHCT 16 and/or the MOD server. If DHCT 16 has a local storage device, either internally or externally connected via a communication port or local storage interface, it can be used to alternatively store user-created list information rather than employing the MOD server or in addition to the MOD server. Attributes comprising a list entry in a designated or user-created list can include a media title, a media title's representative image and/or thumbnail, the time and date that the user created the list entry, identification of user that created the list entry, user-created comments entered by an input device such as keyboard or remote control, and other possible attributes that may help the user recollect the user's train of thought at the time the user inserted the title into the list.

Designated and user-created lists and their respective list entries can be structured into a database, and each set of attributes can comprise a database record in a list database (not shown). Information in designated and user-created lists described herein is read from the DHCT's memory to fill respective data fields in windows presented to a user. Alternatively, the information can be read from the DHCT's local storage (if applicable) or the MOD server.

Regardless of where designated and user-created list information is stored, a subset of information is preferably stored in read-write non-volatile memory of the DHCT 16 by the MOD client application 63 for the MOD client application 63 to find designated and user-created list information in the event that the DHCT 16 experiences a power outage period. This set of designated and user-created list information that is stored in non-volatile memory preferably includes information as to whether there are user-created list entries in any designated or user-created list (for which a single bit of non-volatile memory can be designated), and preferably information such as a directory path or user identification for where a copy of the list database can be retrieved from the MOD server (by the MOD client application 63 in communication with th MOD server) or from the DHCT's local storage device (if applicable).

It should be emphasized that the above-described embodiments of the present invention, particularly any "preferred embodiments", are merely possible examples of the implementations, merely setting forth a clear understanding of the principles of the inventions. Many variations and modifications may be made to the above-described embodiments of the invention without departing substantially from the spirit of the principles of the invention. All such modifications and variations are intended to be included herein within the scope of the disclosure and present invention and protected by the following claims.

Therefore, having thus described the invention, the following is claimed:

1. A method implemented by a television set-top terminal ("STT") comprising steps of:

providing a list of currently viewable video-on-demand presentations listed by their respective titles, wherein the currently viewable list identifies video-on-demand presentations that are currently available for on-demand viewing;

presenting an option to a viewer for selecting a particular currently viewable video-on-demand presentation listed on the currently viewable video-on-demand presentations list to be added to a reminder list, wherein a viewer is provided a mechanism for indicating interest in being reminded at a future time about a particular currently viewable video-on-demand presentation that is currently available for on-demand viewing;

receiving viewer input selecting a particular currently viewable video-on-demand presentation listed on the currently viewable video-on-demand presentations list to be added to the reminder list in response to the option provided for selecting a particular currently viewable video-on-demand presentation listed on the currently viewable video-on-demand presentations list to be added to the reminder list;

providing a list of coming soon video-on-demand presentations listed by their respective titles, wherein the coming soon list identifies video-on-demand presentations that are scheduled to be available for on-demand viewing on a future release date and are not currently available for on-demand viewing;

presenting an option to a viewer for selecting a particular coming soon video-on-demand presentation listed on the coming soon video-on-demand presentations list to be added to the reminder list, wherein a viewer is provided a mechanism for indicating interest in being reminded at a future time about a particular coming soon video-on-demand presentation that is not currently available for on-demand viewing;

receiving viewer input selecting a particular coming soon video-on-demand presentation listed on the coming soon video-on-demand presentations list to be added to the reminder list in response to the option provided for selecting a particular coming soon video-on-demand presentation listed on the coming soon video-on-demand presentations list to be added to the reminder list;

responsive to receiving viewer input requesting display of the reminder list, displaying the reminder list, including displaying on a single screen a plurality of titles, including titles of the selected currently viewable video-on-demand presentation and the selected coming soon video-on-demand presentation as entries in the displayed reminder list, wherein the displayed reminder list is distinct from the list of currently viewable video-on-demand presentations and the list of coming soon video-on-demand presentations, and wherein the future release date of the coming soon video-on-demand presentation is displayable through viewer selection of the title of the coming soon video-on-demand presentation in the reminder list;

subsequent to the displaying of the reminder list, determining whether the release date previously displayed as the future release date for the video-on-demand presentation previously listed as the coming soon video-on-demand presentation is no longer a date in the future; and responsive to both determining that the release date is no longer a date in the future and receiving additional viewer input requesting display of the list of currently viewable video-on-demand presentations, providing to the viewer a message separate from the reminder list that the video-on-demand presentation previously listed as the coming soon video-on-demand presentation is now available for renting, wherein the message includes an option for the viewer to rent the video-on-demand presentation.

2. The method of claim 1, wherein the displaying on the single screen titles of the selected currently viewable video-on-demand presentation and the selected coming soon video-on-demand presentation as entries in the displayed reminder list includes displaying the selected currently viewable video-on-demand presentation and the selected coming soon video-on-demand presentation as intermingled entries in a list arranged alphabetically by titles.

3. The method of claim 1, wherein the displaying on the single screen titles of the selected currently viewable video-on-demand presentation and the selected coming soon video-on-demand presentation as entries in the displayed reminder list includes displaying the selected currently viewable video-on-demand presentation in a currently viewable sub-list and displaying the selected coming soon video-on-demand presentation in a coming soon sub-list.

4. The method of claim 3, wherein the currently viewable sub-list and the coming soon sub-list are displayed in a side-by-side visual arrangement on the screen.

5. The method of claim 4, wherein navigational control is provided to the viewer for transitioning between the currently viewable sub-list and the coming soon sub-list for selection of items listed in the currently viewable sub-list and the coming soon sub-list.

6. The method of claim 3, further including, responsive to determining that the release date is no longer a date in the future for the video-on-demand presentation previously listed as the coming soon video-on-demand presentation, the STT moving the title from the coming soon sub-list to the currently viewable sub-list.

7. The method of claim 3, wherein the message is configured as a barker screen.

8. The method of claim 3, wherein the message further includes an option to remove the video-on-demand presentation from the reminder list.

9. A television set-top terminal ("STT") comprising:
memory configured to store program code; and
a processor programmed by the program code to enable the STT to provide the functions of,
providing a list of currently viewable video-on-demand presentations listed by their respective titles, wherein the currently viewable list identifies video-on-demand presentations that are currently available for on-demand viewing;
presenting an option to a viewer for selecting a particular currently viewable video-on-demand presentation listed on the currently viewable video-on-demand presentations list to be added to a reminder list, wherein a viewer is provided a mechanism for indicating interest in being reminded at a future time about a particular currently viewable video-on-demand presentation that is currently available for on-demand viewing;
receiving viewer input selecting a particular currently viewable video-on-demand presentation listed on the currently viewable video-on-demand presentations list to be added to the reminder list in response to the option provided for selecting a particular currently viewable video-on-demand presentation listed on the currently viewable video-on-demand presentations list to be added to the reminder list;
providing a list of coming soon video-on-demand presentations listed by their respective titles, wherein the coming soon list identifies video-on-demand presentations that are scheduled to be available for on-demand viewing on a future release date and are not currently available for on-demand viewing;
presenting an option to a viewer for selecting a particular coming soon video-on-demand presentation listed on the coming soon video-on-demand presentations list to be added to the reminder list, wherein a viewer is provided a mechanism for indicating interest in being reminded at a future time about a particular coming soon video-on-demand presentation that is not currently available for on-demand viewing;
receiving viewer input selecting a particular coming soon video-on-demand presentation listed on the coming soon video-on-demand presentations list to be added to the reminder list in response to the option provided for selecting a particular coming soon video-on-demand presentation listed on the coming soon video-on-demand presentations list to be added to the reminder list;
responsive to receiving viewer input requesting display of the reminder list, displaying the reminder list, including displaying on a single screen a plurality of titles, including titles of the selected currently viewable video-on-demand presentation and the selected coming soon video-on-demand presentation as entries in the displayed reminder list, wherein the displayed reminder list is distinct from the list of currently viewable video-on-demand presentations and the list of coming soon video-on-demand presentations, and wherein the future release date of the coming soon video-on-demand presentation is displayable through viewer selection of the title of the coming soon video-on-demand presentation in the reminder list;
subsequent to the displaying of the reminder list, determining whether the release date previously displayed as the future release date for the video-on-demand presentation previously listed as the coming soon video-on-demand presentation is no longer a date in the future; and
responsive to both determining that the release date is no longer a date in the future and receiving additional viewer input requesting display of the list of currently viewable video-on-demand presentations, providing to the viewer a message separate from the reminder list that the video-on-demand presentation previously listed as the coming soon video-on-demand presentation is now available for renting, wherein the message includes an option for the viewer to rent the video-on-demand presentation.

10. The STT of claim 9, wherein the displaying on the single screen titles of the selected currently viewable video-on-demand presentation and the selected coming soon video-on-demand presentation as entries in the displayed reminder list includes displaying the selected currently viewable video-on-demand presentation and the selected coming soon video-on-demand presentation as intermingled entries in a list arranged alphabetically by titles.

11. The STT of claim 9, wherein the displaying on the single screen titles of the selected currently viewable video-on-demand presentation and the selected coming soon video-on-demand presentation as entries in the displayed reminder list includes displaying the selected currently viewable video-on-demand presentation in a currently viewable sub-list and displaying the selected coming soon video-on-demand presentation in a coming soon sub-list.

12. The STT of claim 11, wherein the currently viewable sub-list and the coming soon sub-list are displayed in a side-by-side visual arrangement on the screen.

13. The STT of claim 12, wherein navigational control is provided to the viewer for transitioning between the currently viewable sub-list and the coming soon sub-list for selection of items listed in the currently viewable sub-list and the coming soon sub-list.

14. The STT of claim 11, wherein the process is further programmed for providing the function of, responsive to determining that the release date is no longer a date in the future for the video-on-demand presentation previously listed as the coming soon video-on-demand presentation, the STT moving the title from the coming soon sub-list to the currently viewable sub-list.

15. The STT of claim 11, wherein the message is configured as a barker screen.

16. The STT of claim 11, wherein the message further includes an option to remove the video-on-demand presentation from the reminder list.

* * * * *